(12) United States Patent
Li et al.

(10) Patent No.: US 11,849,868 B2
(45) Date of Patent: Dec. 26, 2023

(54) CONNECTING DEVICE

(71) Applicant: Top Victory Investments Limited, Kowloon (HK)

(72) Inventors: Quanbo Li, Fuqing (CN); Guoliang Wang, Fuqing (CN); Li-Wei Lin, New Taipei (TW); Kuo-Hua Liao, New Taipei (TW)

(73) Assignee: Top Victory Investments Limited, Kowloon (HK)

( * ) Notice: Subject to any disclaimer, the term of this patent is extended or adjusted under 35 U.S.C. 154(b) by 404 days.

(21) Appl. No.: 17/234,408

(22) Filed: Apr. 19, 2021

(65) Prior Publication Data

US 2022/0133061 A1 May 5, 2022

(30) Foreign Application Priority Data

Nov. 3, 2020 (TW) .................................. 109138261

(51) Int. Cl.
| | | |
|---|---|---|
| *A47B 96/06* | (2006.01) | |
| *A47B 96/14* | (2006.01) | |
| *A47F 3/12* | (2006.01) | |

(52) U.S. Cl.
CPC ................ *A47F 3/12* (2013.01); *A47B 96/06* (2013.01); *A47B 96/1416* (2013.01); *A47B 2220/0036* (2013.01)

(58) Field of Classification Search
CPC ................ A47B 96/06; A47B 96/1416; A47B 2220/0036; A47B 2230/14; A47F 3/12; A47F 5/00; F16B 2/065; F16B 12/42; E04H 17/1413; E04H 17/1417; E04H 17/1447; E04H 17/24

USPC ........................ 256/59, 65.01, 68, 69, 24, 73
See application file for complete search history.

(56) References Cited

U.S. PATENT DOCUMENTS

| | | | | |
|---|---|---|---|---|
| 379,706 | A | * | 3/1888 | Landis .................. E04H 17/143 256/DIG. 4 |
| 2,815,801 | A | | 12/1957 | Solomon et al. |
| 4,074,893 | A | * | 2/1978 | Coltrin ................ E04H 17/1447 403/182 |

(Continued)

FOREIGN PATENT DOCUMENTS

| | | | |
|---|---|---|---|
| AU | 609021 B3 | 2/1991 | |
| AU | 2006100680 A4 | * 9/2006 | ......... E04H 17/1413 |

(Continued)

OTHER PUBLICATIONS

Search Report issued to European counterpart application No. 21168988.0 by the EPO dated Oct. 4, 2021.

*Primary Examiner* — Ryan D Kwiecinski
(74) *Attorney, Agent, or Firm* — MLO, a professional corp.

(57) ABSTRACT

A connecting device for interconnecting a vertical tube and a plurality of display cabinets for carrying display modules includes first and second connecting frames and a fastening unit. The first connecting frame is for mounting the display cabinets thereon, abuts against a front outer surface of the vertical tube facing the display cabinets. The second connecting frame abuts against a rear outer surface of the vertical tube facing away from the first connecting frame. The fastening unit includes first fastening sets fastening the first and second connecting frames together so as to clamp the vertical tube therebetween. The second fastening sets fasten securely the display cabinets to the first connecting frame.

16 Claims, 19 Drawing Sheets

(56) References Cited

U.S. PATENT DOCUMENTS

| | | | | |
|---|---|---|---|---|
| 4,471,947 A * | 9/1984 | Osborne | E04H 17/143 | 256/69 |
| 4,964,618 A * | 10/1990 | Kennedy | E04H 17/1413 | 256/65.09 |
| 5,078,367 A * | 1/1992 | Simpson | E04H 17/1602 | 256/73 |
| 5,632,567 A * | 5/1997 | Lowe | F16B 43/00 | 403/258 |
| 5,961,242 A * | 10/1999 | Leone | F16B 7/048 | 248/230.1 |
| 6,039,150 A * | 3/2000 | Palmer | E04G 21/3223 | 182/113 |
| 6,443,433 B1 * | 9/2002 | Auldridge | E04H 17/1413 | 256/69 |
| 6,454,487 B1 * | 9/2002 | Buenning | F16B 5/0685 | 403/389 |
| 6,557,666 B1 * | 5/2003 | Drouin | E04G 21/32 | 182/178.1 |
| 6,902,152 B1 * | 6/2005 | Clifford | E04H 17/1413 | 256/65.01 |
| 7,523,715 B2 * | 4/2009 | Mettler | F16M 11/22 | 256/65.01 |
| 8,074,969 B2 * | 12/2011 | Lee | E04H 17/1413 | 256/60 |
| 8,220,781 B2 * | 7/2012 | Gray | E04H 17/1473 | 256/65.13 |
| 8,448,923 B1 * | 5/2013 | Schad | E04G 21/3219 | 256/65.03 |
| 8,910,367 B2 * | 12/2014 | Adams, Jr. | F16B 7/00 | 403/233 |
| 8,910,925 B2 * | 12/2014 | Payne | E04H 17/24 | 256/45 |
| 8,960,512 B2 * | 2/2015 | Maenle | A01B 23/02 | 224/558 |
| 9,115,506 B2 * | 8/2015 | Hill | E04H 17/1417 | |
| 10,689,866 B2 * | 6/2020 | Baca | E04G 5/14 | |
| 10,894,593 B2 * | 1/2021 | Benson | B64C 1/26 | |
| 11,007,832 B1 * | 5/2021 | Rebick | B60D 1/52 | |
| 2007/0034846 A1 * | 2/2007 | Ratanasiriwilai | E04H 17/1447 | 256/65.01 |
| 2009/0146123 A1 * | 6/2009 | Hewitt | E01F 7/02 | 256/45 |
| 2010/0092236 A1 * | 4/2010 | Kang | E04B 1/585 | 403/170 |
| 2014/0264219 A1 * | 9/2014 | McCann | E04H 17/143 | 256/65.01 |
| 2014/0332745 A1 * | 11/2014 | Marconi | E04F 11/1859 | 256/65.01 |
| 2019/0277022 A1 * | 9/2019 | Francis | F16B 7/0433 | |
| 2022/0133061 A1 * | 5/2022 | Li | A47F 3/12 | 52/36.5 |
| 2022/0195750 A1 * | 6/2022 | Shepherd | E04H 17/161 | |

FOREIGN PATENT DOCUMENTS

| | | | | |
|---|---|---|---|---|
| CA | 2820331 A1 * | 12/2013 | | E04H 12/2238 |
| EP | 779026 A1 * | 6/1997 | | A01K 1/0011 |
| EP | 1985202 A1 | 10/2008 | | |
| EP | 2014929 A1 * | 1/2009 | | A47B 47/021 |
| EP | 2166170 A1 * | 3/2010 | | A47B 47/00 |
| EP | 3228225 A1 | 10/2017 | | |
| FR | 2712044 A1 * | 5/1995 | | F16B 7/0486 |
| GB | 2094369 A * | 9/1982 | | E04H 17/1434 |
| GB | 2507537 A | 5/2014 | | |
| GR | 20080100336 A | 12/2009 | | |
| JP | 2005086393 A | 3/2005 | | |
| TW | 753635 B1 * | 1/2022 | | A47B 96/06 |
| WO | WO-8802428 A * | 4/1988 | | E01F 8/007 |
| WO | WO-2015181715 A1 * | 12/2015 | | E04H 17/04 |

* cited by examiner

CONNECTING DEVICE

CROSS-REFERENCE TO RELATED APPLICATION

This application claims priority of Taiwanese Invention Patent Application No. 109138261, filed on Nov. 3, 2020.

FIELD

The disclosure relates to a connecting device, more particularly to a connecting device for interconnecting a vertical tube and a plurality of display cabinets for carrying display modules.

BACKGROUND

Currently, a display cabinet for carrying an LED display module is generally connected to a vertical tube of a wall mounting frame through a plurality of conventional connecting devices.

One kind of the conventional connecting device includes a connecting plate disposed between a front side of the vertical tube and rear surfaces of the display cabinets. The connecting plate is formed with a threaded hole at a center thereof and four through holes. Each of the through holes is registered with a threaded opening of a respective one of the display cabinets, and a screw extends through the through hole and threadedly engages the threaded opening so as to secure the connecting plate to the display cabinet. The vertical tube is formed with a through bore registered with the threaded hole of the connecting plate, and another screw extends through the through bore and threadedly engages the threaded hole of the connecting plate to secure the connecting plate to the vertical tube.

The vertical tube is processed to form the through bore before the connecting plate is mounted to the vertical tube. To prevent a gap from being formed between any adjacent two of the display cabinets after being mounted to the vertical tube via the connecting plate, the precision of the through bore is critical. As a result, it is troublesome to process the vertical tube, and the assembly is time-consuming and labor-consuming. Additionally, the wall mounting frame is only dedicated for mounting display cabinets having a specific size, and thus the applicability is reduced. Furthermore, since only one screw that extends through the vertical tube and the connecting plate supports the weight of the display modules, the connection strength among the display modules, the connecting plate and the vertical tube is relatively low. As a result, deformation of the vertical tube and the screw or even breakage of the screw may be caused.

Another kind of the conventional connecting device includes connecting plate that has a width greater than that of the vertical tube and that is disposed behind the vertical tube, and the vertical tube abuts against rear surfaces of the display modules. When a plurality of screws extend respectively through threaded holes formed in the vertical tube to fasten the connecting plate to the vertical tube, the connecting plate tends to deform since the screws exert excessive force thereon. As a result, the vertical tube may also deform and warp forwardly, which in turn forms a significant connection gap between any adjacent two of the display cabinets.

SUMMARY

Therefore, an object of the disclosure is to provide a connecting device that can alleviate the drawbacks of the prior art.

According to one aspect of the disclosure, a connecting device for interconnecting a vertical tube and a plurality of display cabinets for carrying display modules is provided. The vertical tube includes a plurality of vertical outer surface portions. The connecting device includes a first connecting frame, a second connecting frame, and a fastening unit. The first connecting frame is adapted for mounting the display cabinets thereon, is adapted to be disposed in front of the vertical tube, and is adapted to abut against a front one of the outer surface portions of the vertical tube that faces the display cabinets. The second connecting frame is spaced apart from the first connecting frame along a front-rear direction, is adapted to be disposed behind the vertical tube, and is adapted to abut against a rear one of the outer surface portions of the vertical tube that faces away from the first connecting frame. The fastening unit includes two first fastening sets and a plurality of second fastening sets. The first fastening sets are spaced apart from each other along a left-right direction transverse to the front-rear direction and fasten the first connecting frame securely to the second connecting frame so as to clamp the vertical tube between the first connecting frame and the second connecting frame. The second fastening sets are adapted to fasten the display cabinets securely to the first connecting frame.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
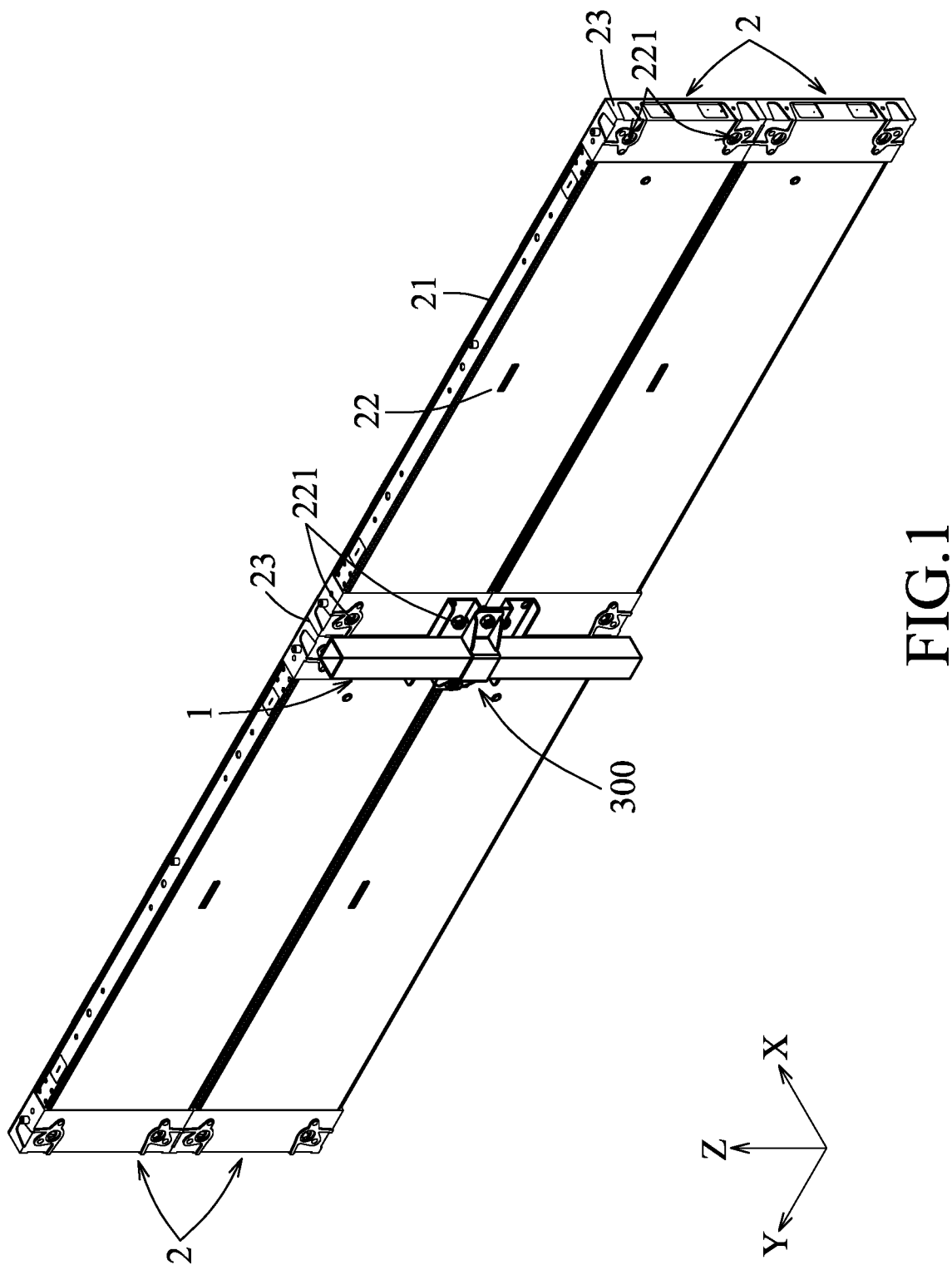
FIG. 1 is a schematic perspective view of a connecting device according to a first embodiment of the present disclosure interconnecting a vertical tube and a plurality of display cabinets for carrying display modules.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
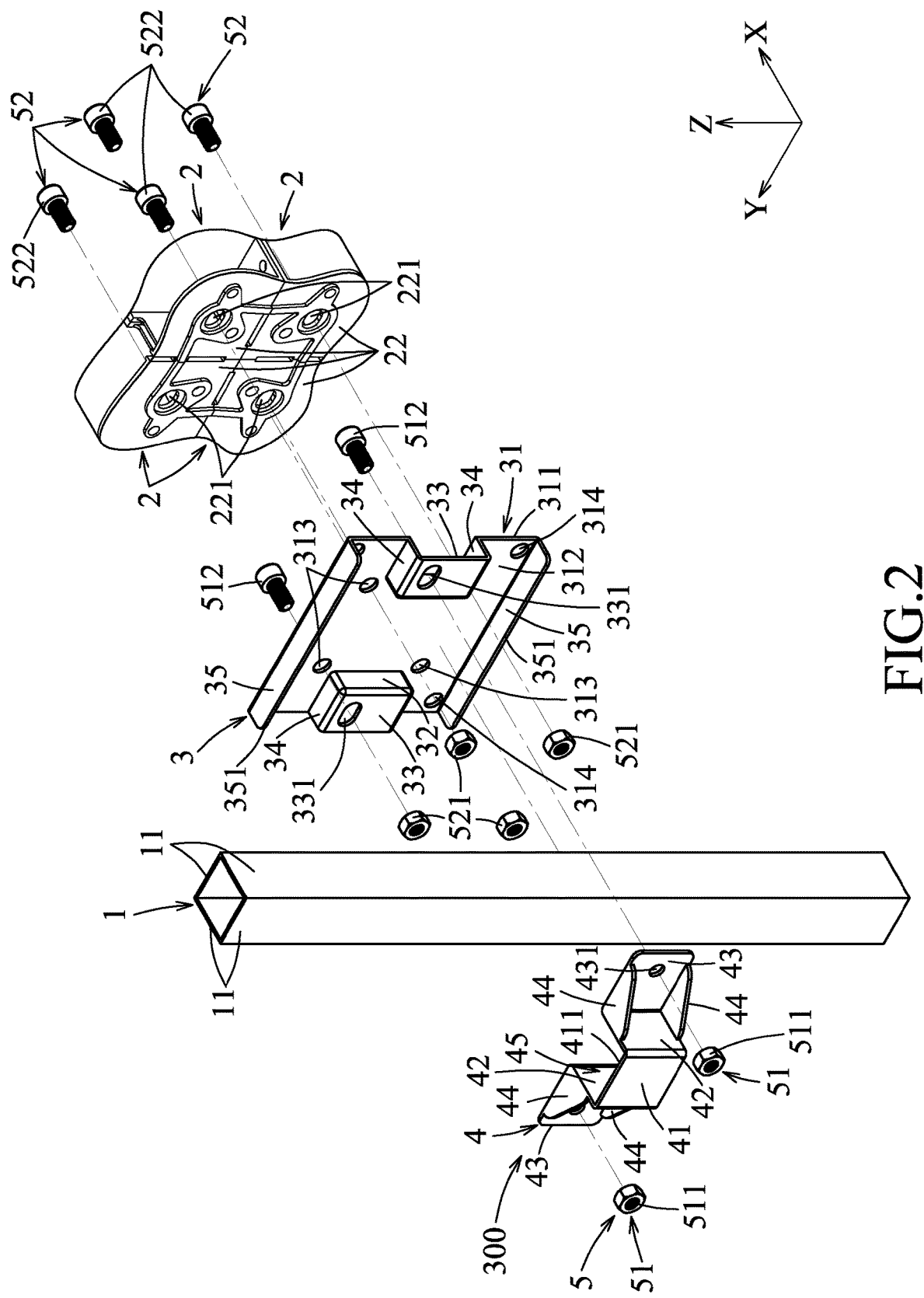
FIG. 2 is a fragmentary partly exploded perspective view of the first embodiment, the vertical tube and the display cabinets, illustrating assembling relationship among a first connecting frame, a second connecting frame, a fastening unit, the vertical tube, and the display cabinets.

Referring to FIGS. 1 and 2, a connecting device 300 according to a first embodiment of the present disclosure is for interconnecting a vertical tube 1 and a plurality of display cabinets 2 for carrying display modules.

The vertical tube 1 is a square vertical tube having a square cross section, and has four interconnected vertical outer surface portions 11. In this embodiment, the number of the display cabinets 2 to be connected to the vertical tube 1 by the connecting device 300 is four, in which two of the display cabinets 2 adjoin each other along a left-right direction (Y) and the remaining two display cabinets 2 also adjoin each other along the left-right direction (Y) and are stacked on the two of the display cabinets 2 along an up-down direction (Z) transverse to the left-right direction (Y). Each of the display cabinets 2 includes a supporting plate 21, a back plate 22, and two side plates 23. Both the supporting plate 21 and the back plate 22 are elongated planks. The supporting plate 21 is for supporting at least one of the display modules (not shown). The back plate 22 is opposite to the supporting plate 21 along a front-rear direction (X) and is formed with four openings 221. The openings 221 are respectively adjacent to four corners of the back plate 22. The side plates 23 are respectively connected to left and right ends of the back plate 22. The supporting plate 21 is detachably mounted to front ends of the side plates 23. In this embodiment, the side plates 23 are perpendicular to the supporting plate 21 and the back plate 22.

Figure 3:
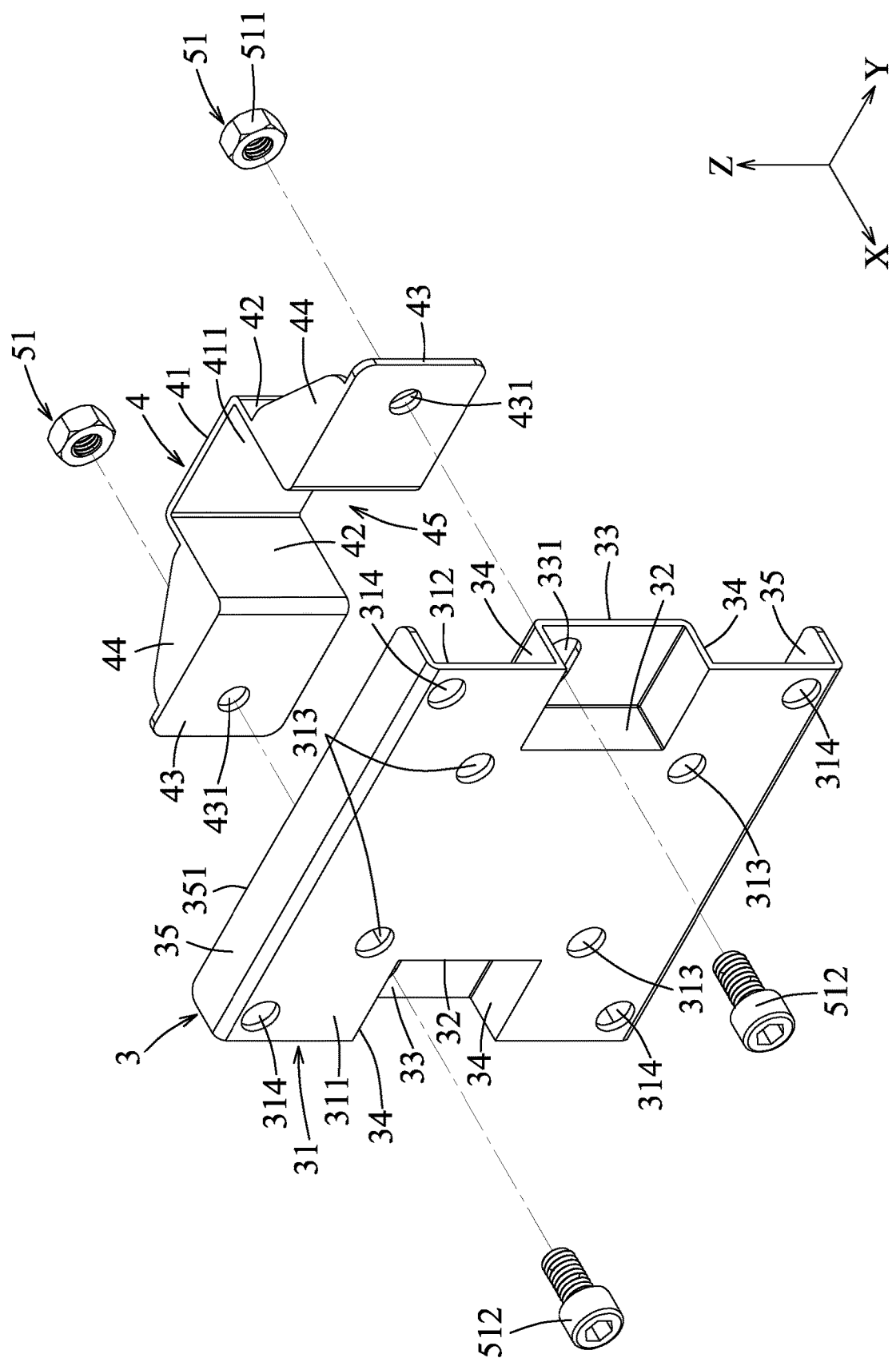
FIG. 3 is a schematic exploded perspective view of the first embodiment, illustrating assembling relationship among the first and second connecting frames and two first fastening sets of the fastening unit.

Referring to FIGS. 2 and 3, the connecting device 300 includes a first connecting frame 3, a second connecting frame 4, and a fastening unit 5. The first connecting frame 3 includes a vertical supporting plate 31, two vertical bent plates 32, two first vertical connecting plates 33, two pairs of horizontal first strengthening plates 34, and two horizontal first abutment plates 35. The vertical supporting plate 31 is an upright plate, and has a vertical mounting surface 311 and a back surface 312. The mounting surface 311 is an upright surface adapted for mounting the back plates 22 of the display cabinets 2 thereon. The back surface 312 is opposite to the mounting surface 311 along the front-rear direction (X). The vertical supporting plate 31 is formed with four perforated holes 313 and four through holes 314. The perforated holes 313 extend through the supporting surface 311 and the back surface 312 along the front-rear direction (X), are spaced apart from one another, and are arranged in a square. Each of the perforated holes 313 corresponds in position to a respective one of the openings 221 formed in the back plate 22 of a corresponding one of the display cabinets 2. The through holes 314 extend through the supporting surface 311 and the back surface 312 along the front-rear direction (X), are spaced apart from one another, and are arranged in another square surrounding the perforated holes 313. The through holes 314 are adjacent respectively to the four corners of the vertical supporting plate 31.

Figure 4:
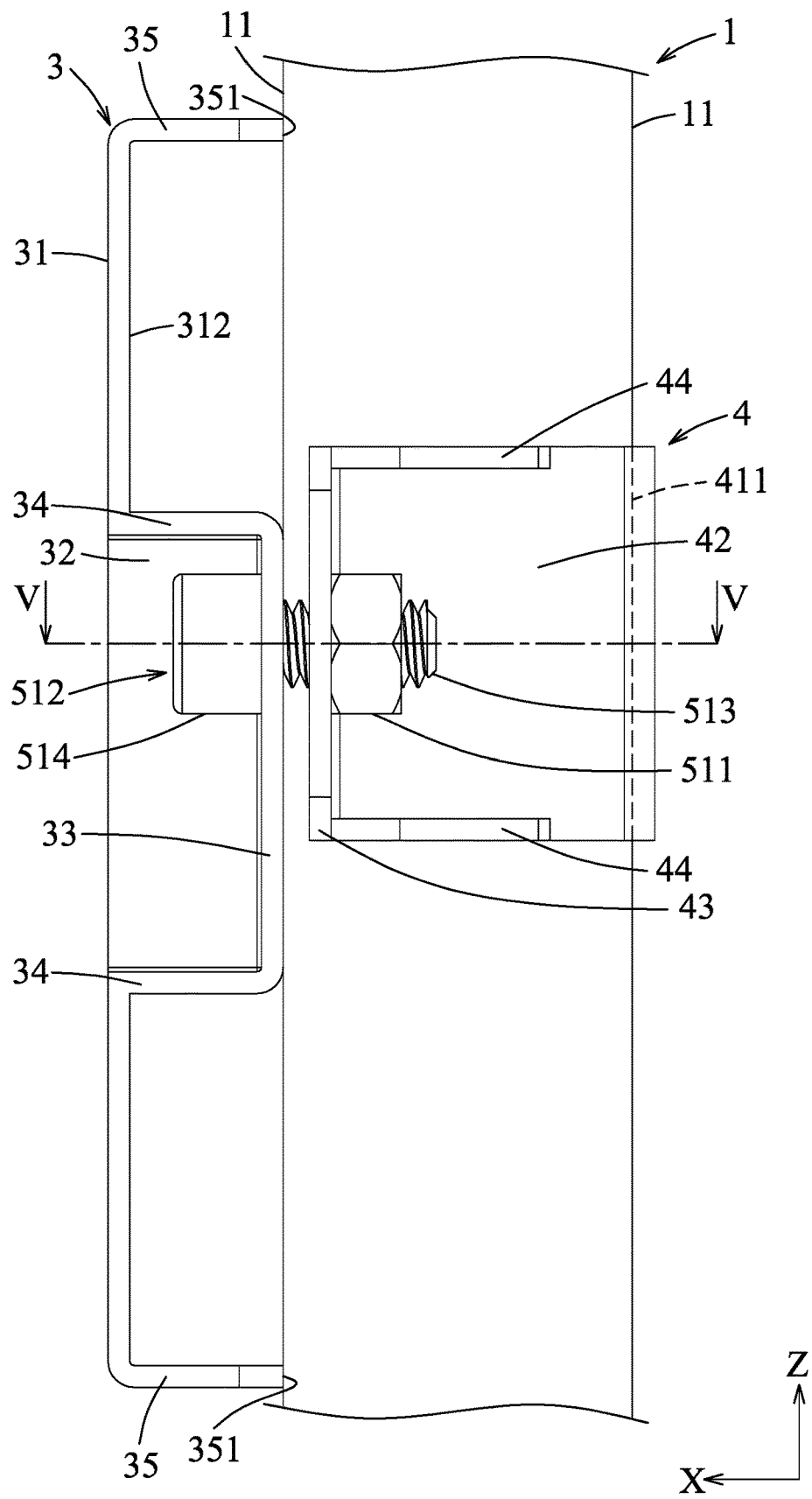
FIG. 4 is a fragmentary schematic sectional view of the first embodiment mounted to the vertical tube, illustrating the first and second connecting frames clamp the vertical tube therebetween, and the first fastening set fastening the first connecting frame securely to the second connecting frame.

Referring to FIGS. 2, 3 and 4, the bent plates 32 extend rearwardly from the back surface 312 of the vertical supporting plate 31 and are spaced apart from each other along the left-right direction (Y). Each of the bent plates 32 is an upright plate perpendicular to the vertical supporting plate 31. Each of the first connecting plates 33 extends perpendicularly from a respective one of the bent plates 32, is parallel to the vertical supporting plate 31 and is spaced apart from the back surface 312 along the front-rear direction (X). Each of the first connecting plates 33 is formed with an elongated through hole 331 formed through the front-rear direction (X) and extending along the left-right direction (Y).

The two pairs of the first strengthening plates 34 are adapted to flank the vertical tube 1, and are spaced apart from each other along the left-right direction (Y). Each of the first strengthening plates 34 is connected among the vertical supporting plate 31, a respective one of upper and lower ends of a respective one of the bent plates 32, and a respective one of upper and lower ends of a respective one of the first connecting plates 33. Each pair of the first strengthening plates 34 are spaced apart from each other along the up-down direction (Z), are connected respectively to upper and lower ends of a corresponding one the bent plates 32, and are connected respectively to upper and lower ends of a respective one of the first connecting plates 33. The first strengthening plates 34 are provided for enhancing structural strength to prevent the first connecting plates 33 from being bent.

The first abutment plates 35 extend rearwardly and respectively from upper and lower ends of the vertical supporting plate 31 and are opposite along the up-down direction (Z). Each of the first abutment plates 35 is perpendicular to the vertical supporting plate 31, has a vertical first abutment surface 351 that faces rearwardly and that is adapted to abut against the front one of the outer surface portions 11 of the vertical tube 1 (i.e., the front surface portion 11).

The second connecting frame 4 includes a vertical second abutment plate 41, two vertical side plates 42, two second vertical connecting plates 43 and two pairs of horizontal second strengthening plates 44. The second abutment plate 41 is an upright plate and has a vertical second abutment surface 411 facing forwardly, and adapted to abut against a rear one of the outer surface portions 11 of the vertical tube 1 (i.e., the rear surface portion). The vertical side plates 42 extend respectively, forwardly and perpendicularly from left and right ends of the second abutment plate 41 along the front-rear direction (X). The second connecting plates 43 extend respectively and outwardly from front ends of the side plates 42. Each of the second connecting plates 43 is perpendicular to the respective one of the side plates 42 connected thereto, and is formed with a through hole 431. The second connecting plates 43 correspond respectively in position to rear surfaces of the first connecting plate 33 along the front-rear direction (X), and the through holes 431 of the second connecting plates 43 are registered respectively with the through holes 331 of the first connecting plate 33. The second abutment plate 41, the side plates 42 and the second connecting plates 43 cooperate with one another to define a receiving slot 45 adapted for receiving the vertical tube 1 therein. The two pairs of second strengthening plates 44 are adapted to flank the vertical tube 1. Each pair of the second strengthening plates 44 are spaced apart from each other along the up-down direction (Z). Each of the second strengthening plates 44 is connected between a corresponding one of the second connecting plates 43 and a respective one of the side plates 42 to enhance connection strength between the second connecting plates 43 and the respective side plates 42 so as to prevent deformation of the second connecting plates 43.

The fastening unit 5 includes two first fastening sets 51 and a plurality of second fastening sets 52. The first fastening sets 51 are spaced apart from each other along the left-right direction (Y) and fasten the first connecting plates 33 securely and respectively to the second connecting plate 43 so as to clamp the vertical tube 1 between the first connecting frame 3 and the second connecting frame 4. Each of the first fastening sets 51 includes a first nut 511 and a first bolt 512. The first nut 511 of each of the first fastening sets 51 abuts against the rear surfaces of the corresponding one of the second connecting plate 43. Each of the first bolts 512 extends through a respective one of the through holes 331 and the corresponding one of the through holes 431 and threadedly engages a respective one of the first nuts 511 to fasten a respective one of the first connecting plates 33 to the corresponding one of the second connecting plates 43. In this embodiment, the number of the second fastening sets 52 is four, and the second fastening sets 52 are adapted to fasten the display cabinets 2 securely to the vertical supporting plate 31 of the first connecting frame 3. Each of the second fastening sets 52 includes a second nut 521 and a second bolt 522. The second nuts 521 abut against the back surface 312 of the vertical supporting plate 31 and are registered respectively with the perforated holes 313. The second bolt 522 of each of the second fastening sets 52 extends through one of the openings 221 of one of the display cabinets 2 and a respective one of the respective perforated holes 313, and threadedly engages a respective one of the second nuts 521 to fasten the one of the display cabinets 2 onto the vertical supporting plate 31.

The method for interconnecting the vertical tube 1 and the display cabinets 2 by the connecting device 300 is to be described in the following.

Figure 5:
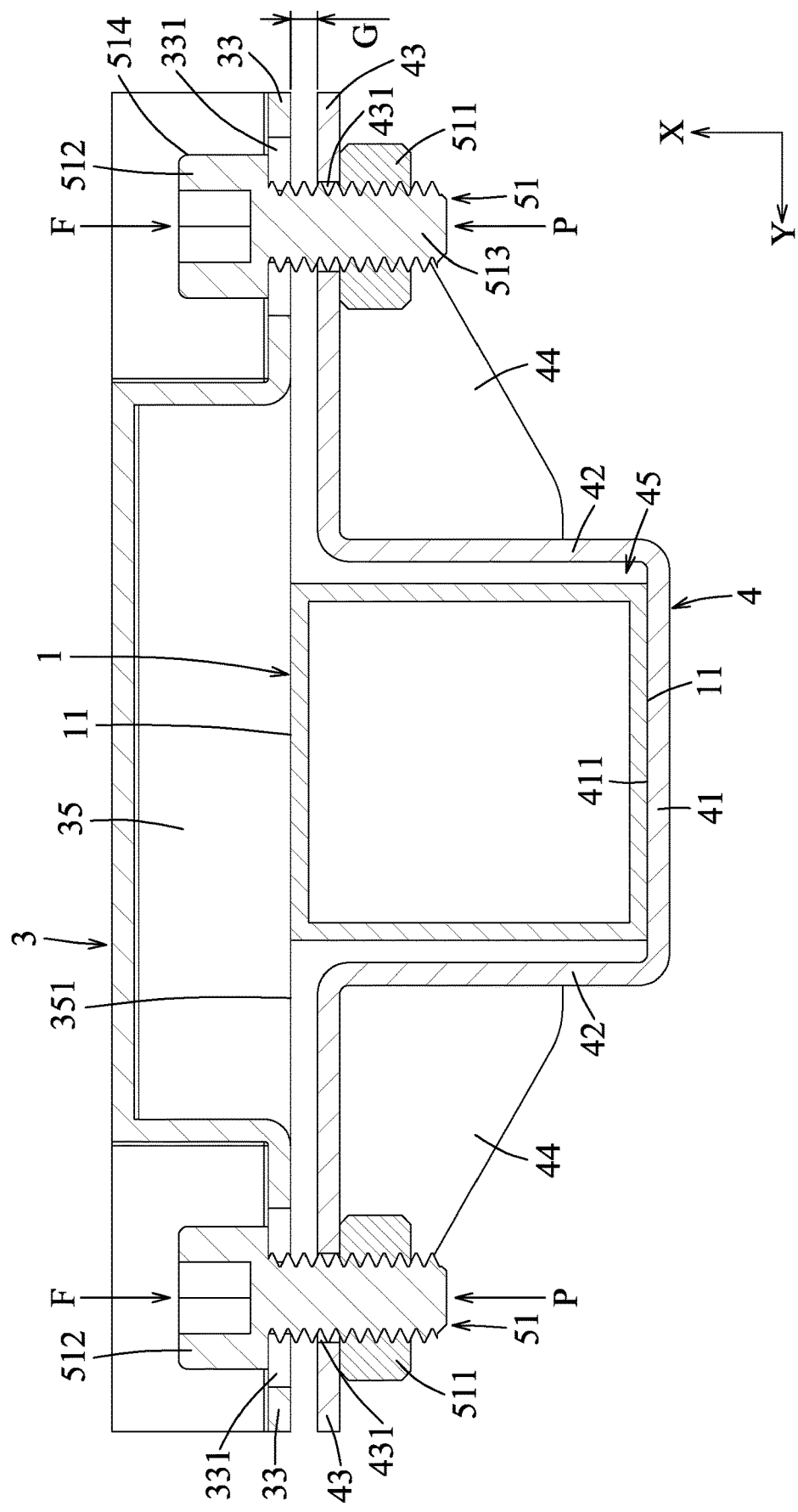
FIG. 5 is a sectional view taken along line V-V in FIG. 4.
Figure 6:
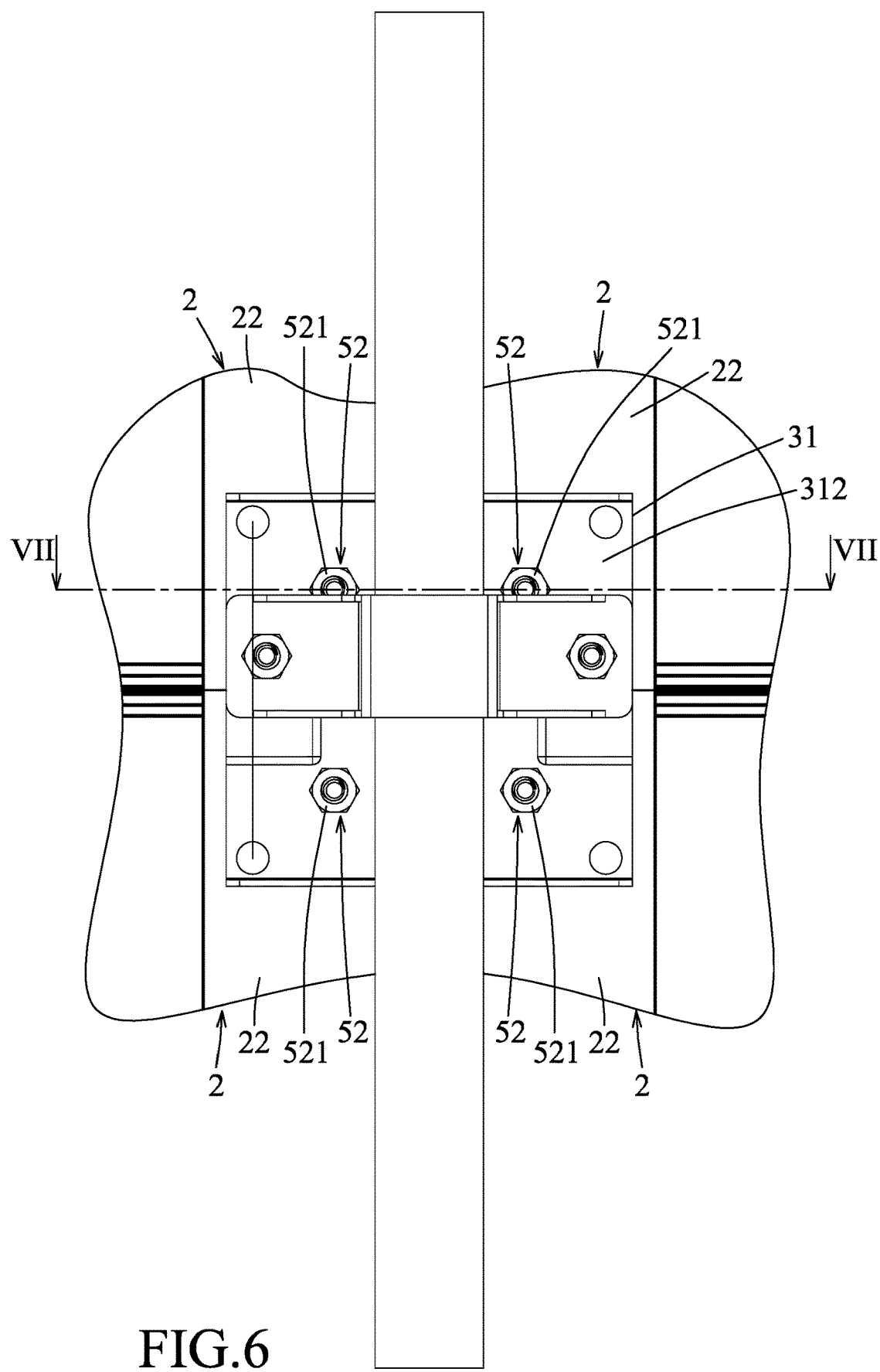
FIG. 6 is a fragmentary rear view illustrating the first embodiment interconnecting the vertical tube and the display cabinets.
Figure 7:
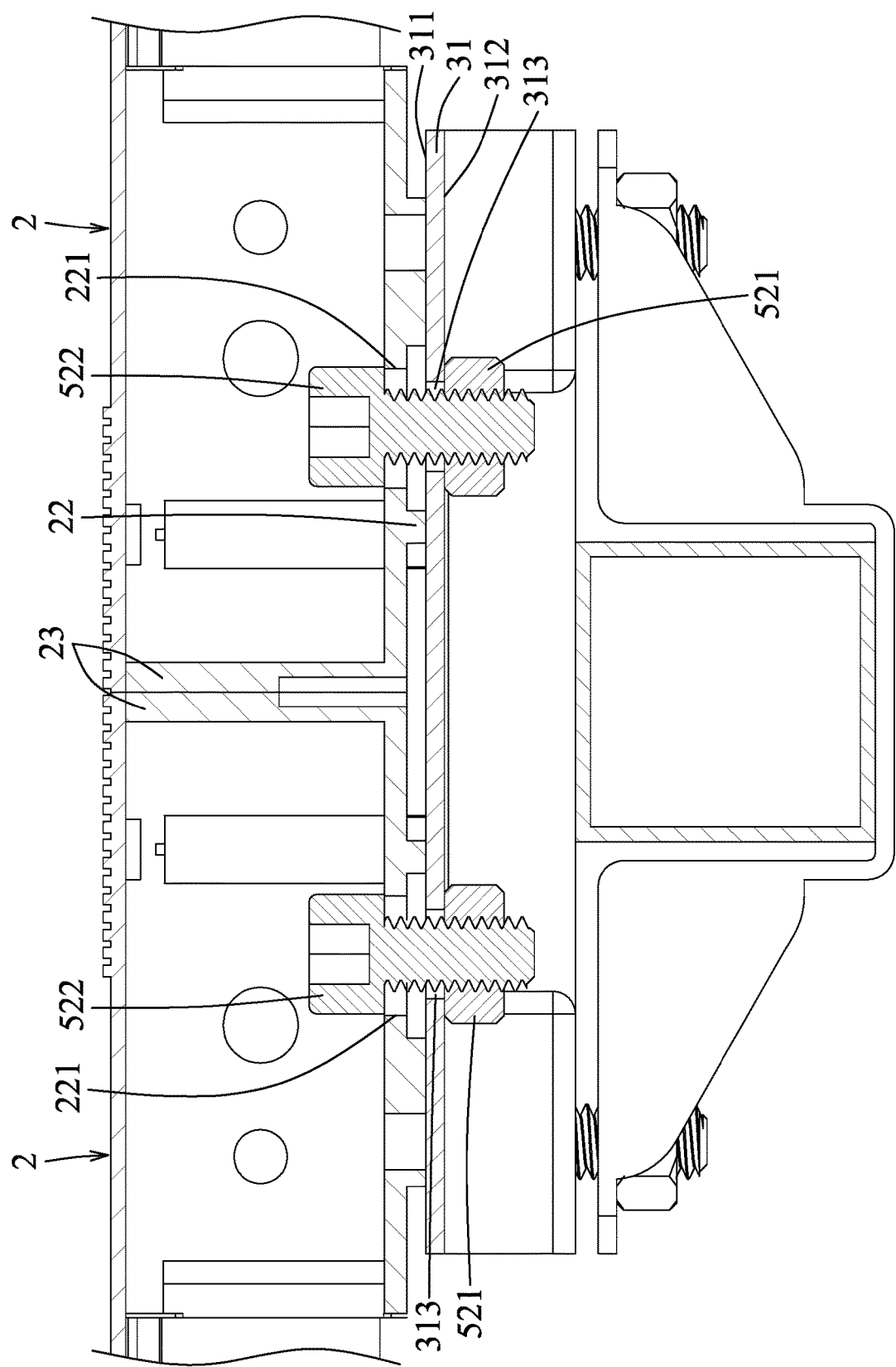
FIG. 7 is a sectional view taken along line VII-VII in FIG. 6, illustrating a plurality of second fastening sets of the fastening unit fastening the display cabinets respectively to the first connecting frame.

Referring to FIGS. 4 and 5, during assembly, the second connecting frame 4 is first moved to a position located behind the vertical tube 1, so as to align the receiving slot 45 of the second connecting frame 4 with the vertical tube 1. Subsequently, the second connecting frame 4 is moved forwardly toward the vertical tube 1 so that the vertical tube 1 is received in the receiving slot 45 and the second abutment surface 411 of the second abutment plate 41 abuts against the rear one of the outer surface portions 11 of the vertical tube 1. Since the depth of the receiving slot 45 along the front-rear direction (X) is smaller than a dimension of the vertical tube 1 along the front-rear direction (X), a portion of the vertical tube 1 is exposed outwardly of the receiving slot 45. That is, the vertical tube 1 protrudes outwardly of front surfaces of the second connecting plates 43.

Then, the first connecting frame 3 is brought to align with the second connecting frame 4 such that the through holes 331 of the first connecting plates 33 are registered respectively with the through holes 431 of the second connecting plates 43. Afterwards, the first connecting frame 3 is moved toward the vertical tube 1 so as to bring a middle portion of the first abutment surfaces 351 of the first abutment plates 35 to abut against the front surface portions 11 of the vertical tube 1. At this time, the first connecting plates 33 are respectively spaced apart from the second connecting plates 43 by a distance (G) along the front-rear direction (X). By virtue of each of the side plates 42 that is connected between the second abutment plate 41 and the respective one of the second connecting plates 43, the second connecting frame 4 is formed with the structure of the receiving slot 45 for receiving the vertical tube 1 therein. Further, the distance (G) between each of the second connecting plates 43 and the corresponding one of the first connecting plates 33 is relatively small, and thus the length of each of the first bolts 512 can be relatively short.

Hereafter, the first nuts 511 are brought to abut against the rear surfaces of the second connecting plates 43 and register respectively with the through holes 431. Each of the first bolts 512 includes a head 514 and a threaded stem 513 (see FIG. 5) extending from the head 514 (see FIG. 5) and being brought to extend through one of the through holes 331 and the corresponding one of the through holes 431. The first nuts 511 are then brought to respectively and threadedly engage the first bolts 512 until the heads 514 of the first bolts 512 abut respectively against front surfaces of the first connecting plates 33 and the first nuts 511 abut respectively against the rear surfaces of the second connecting plates 43. At this time, as shown in FIG. 5, when the head 514 of each of the first bolts 512 is continuously rotated about its axis, a first pressure (F) parallel to the front-rear direction (X) is exerted on one of the first connecting plate 33 and a second pressure (P) opposite to the first pressure (F) is exerted on the corresponding one of the second connecting plates 43 by the first nut 511.

Since two pairs of horizontal first strengthening plates 34 are connected among the first connecting plates 33 and the vertical bent plates 32, the upper and lower ends of each of the first connecting plates 33 are fixed relative to one corresponding pair of the first strengthening plates 34. As such, the first pressure (F) exerted on the first connecting plates 33 would not cause deformation of the bent plates 32 connected thereto. Additionally, since two pairs of horizontal second strengthening plates 44 are connected among the second connecting plates 43 and the vertical side plates 42, the upper and lower ends of each of the second connecting plates 43 are fixed relative to one corresponding pair of the second strengthening plates 44. As such, the second pressure (P) exerted on the second connecting plates 43 would not cause deformation of the side plates 42 connected thereto. Further, since each of the first connecting plates 33 is spaced apart from the corresponding one of the second connecting plates 43 by the distance (G), the first pressure (F) and the second pressure (P) cannot cancel each other out. Based on the abovementioned reasons, the first pressure (F) propagates through the first connecting plates 33, the bent plates 32 connected to the first connecting plates 33, the first strengthening plates 34 and the vertical supporting plate 31 to the first abutment plates 35, such that the first abutment surface 351 of each of the first abutment plates 35 abuts tightly against the front surface portions 11 of the vertical tube 1 without causing warpage. At the same time, the second pressure (P) propagates through the second connecting plates 43, the second strengthening plates 44 connected to the second connecting plates 43, and the vertical side plates 42 to the second abutment plate 41, such that the vertical second abutment surface 411 of the second abutment plate 41 abuts against the outer surfaces 11 of the tube 1 without causing warpage. Thus, the first and second connecting frames 3, 4 securely clamp the vertical tube 1 therebetween.

Referring to FIGS. 2, 4, 6 and 7, the second nuts 521 are brought to abut against the back surface 312 of the vertical supporting plate 31, and registered respectively with the perforated holes 313, such that the back plate 22 of each of the display cabinets 2 abuts against the vertical mounting surface 311 of the vertical supporting plate 31 to align one of the openings 221 of each of the display cabinets 2 with the corresponding one of the perforated holes 313. After the first bolts 512 respectively engages the first nuts 511, the head 514 of each of the first bolts 512 is rested on the corresponding one of the vertical connecting plates 33 and does not protrude from the mounting surface 311 of the vertical supporting plate 31, so that the back plates 22 of the display cabinets 2 can abut against the mounting surface 311 without being obstructed by the heads 514. Then, each of the second bolts 522 is brought to extend through the respective one of the openings 221 and the corresponding one of the perforated holes 313 and to respectively engage the second nuts 521 to fasten the corresponding one of the display cabinets 2 to the vertical supporting plate 31.

Figure 8:
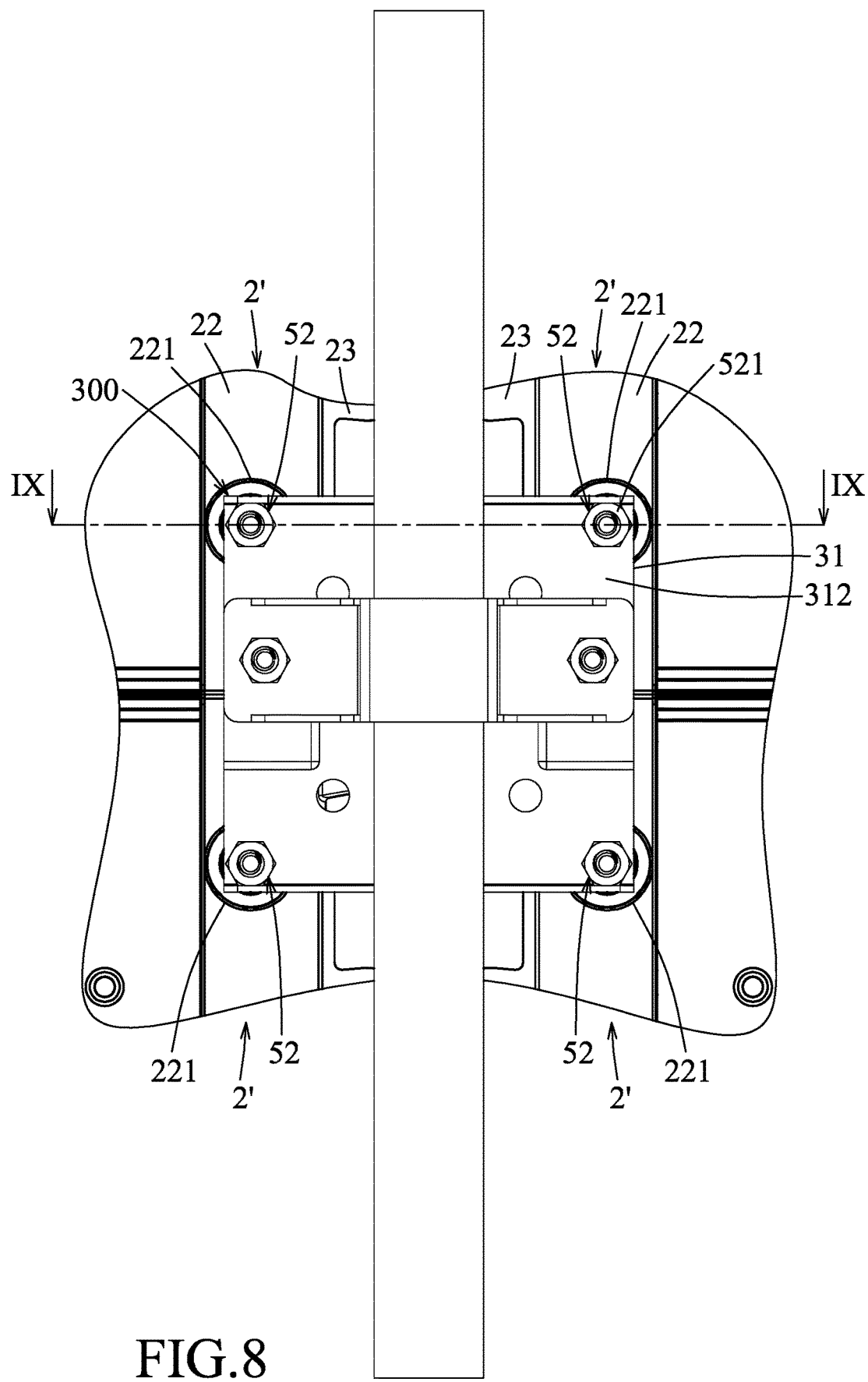
FIG. 8 is a fragmentary rear view of the first embodiment interconnecting the vertical tube and a plurality of display cabinets having a different configuration.
Figure 9:
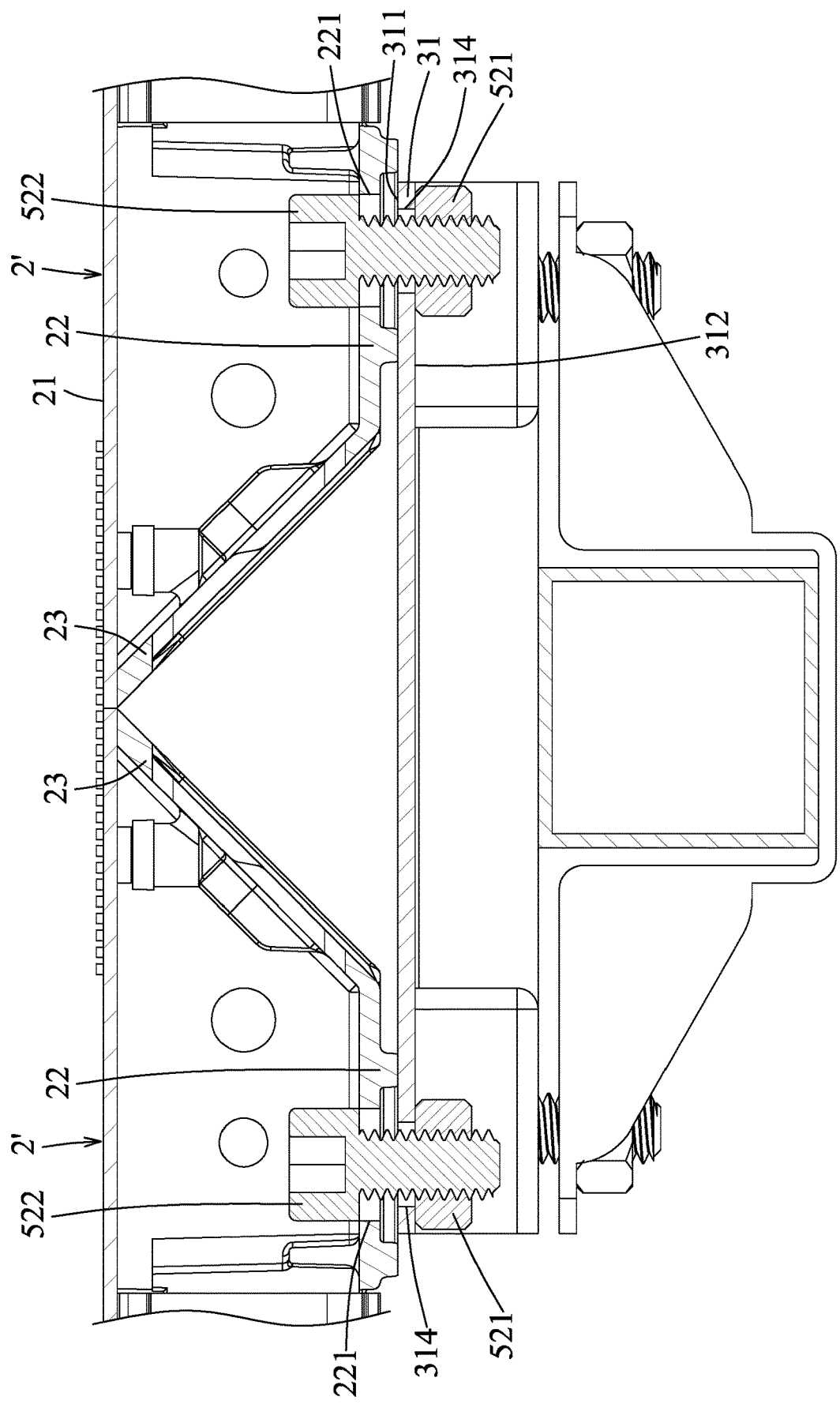
FIG. 9 is a sectional view taken along line IX-IX in FIG. 8.

Referring to FIGS. 8 and 9, in the first embodiment, the connecting device 300 is capable of interconnecting a vertical tube 1 and a plurality of display cabinets 2' having a configuration different from that described in FIGS. 1 to 7. The difference between the display cabinets 2' and the display cabinets 2 shown in FIG. 7 resides in that the side plates 23 of each of the display cabinets 2' are inclined relative to the supporting plate 21 and the back plate 22. Each of the side plates 23 cooperates with the supporting plate 21 to define an included angle of 45 degrees therebetween. Since the side plates 23 are inclined relative to the back plate 22, a distance between two of the openings 221 of two adjacent display cabinets 2' is larger than that of two of the openings 221 of two adjacent display cabinets 2 shown in FIG. 7.

During assembly, the second nuts 521 are brought to abut against the back surface 312 of the vertical supporting plate 31 and registered respectively with the through holes 314, and the back plates 22 of the display cabinets 2' are brought to abut against the mounting surface 311 of the vertical supporting plate 31, such that one of the openings 221 of each of the display cabinets 2' is registered with and corresponds in position to the corresponding one of the through holes 314. Then, the second bolts 522 are brought to extend respectively through the openings 221 of respective display cabinets 2' and the through holes 314, and respectively engage the second nuts 521 to fasten the display cabinets 2' onto the vertical supporting plate 31.

By virtue of the design of the vertical supporting plate 31 that is formed with four perforated holes 313 and four through holes 314, the second bolts 522 of the second fastening sets 52 can be optionally brought to extend through the perforated holes 313 or the through holes 314, and the connecting device 300 can be used for interconnecting the display cabinets 2 and 2' having different configurations, thereby increasing the range and flexibility in usage of the connecting device 300.

Referring to FIGS. 2, 5, 7 and 9, by virtue of the design of the first connecting frame 3, the second connecting frame 4 and the fastening unit 5 of the connecting device 300 of the first embodiment, the vertical tube 1 and the display cabinets 2, 2' can be assembled together in a relatively fast and simple manner. As compared to the conventional techniques, the steps for assembling are fewer, and thus the time for assembling can be reduced significantly. Additionally, by virtue of the structural design of the first connecting frame 3 and the second connecting frame 4, the first fastening sets 51 fasten the first connecting frame 3 to the second connecting frame 4 so that the first abutment surfaces 351 abut against the front surface portions 11 of the vertical tube 1 and the second abutment surfaces 411 abuts against the rear surface portions 11 of the vertical tube 1 to achieve an effect of full contact among the vertical tube 1 and the first and second connecting frames 3, 4. As such, the first and second connecting frames 3, 4 can be prevented from warpage when being assembled by the first fastening sets 51. Thus, the vertical mounting surface 311 of the vertical supporting plate 31 flatly abut against the back plates 22 of the display cabinets 2, 2' to achieve an effect of full contact among the back plates 22 of the display cabinets 2, 2' and the vertical mounting surface 311 of the vertical supporting plate 31 without causing warpage. Accordingly, the vertical mounting surface 311 of the first connecting frame 3 is able to abut against the back plates 22 of the display cabinets 2, 2' to achieve the effect of full contact among the back plates 22 of the display cabinets 2, 2' and the first connecting frame 3, thereby preventing the display cabinets 2, 2' from warpage and increased connection gaps between any adjacent two of the display cabinets 2, 2'.

It should be stated that in other implementations of the first embodiment, the first connecting frame 3 only includes two of the horizontal first strengthening plates 34. Each of the first strengthening plates 34 is connected among the vertical supporting plate 31, a respective one of upper and lower ends of a respective one of the bent plates 32, and a respective one of the upper and lower ends of a respective one of the first connecting plate 33. Similarly, the second connecting frame 4 may include only two horizontal second strengthening plates 44. Each of the second strengthening plates 44 is connected between a corresponding one of the second connecting plates 43 and a respective one of the side plates 42. The number of the first and second strengthening plates 33, 44 is not limited to the examples described herein.

Figure 10:
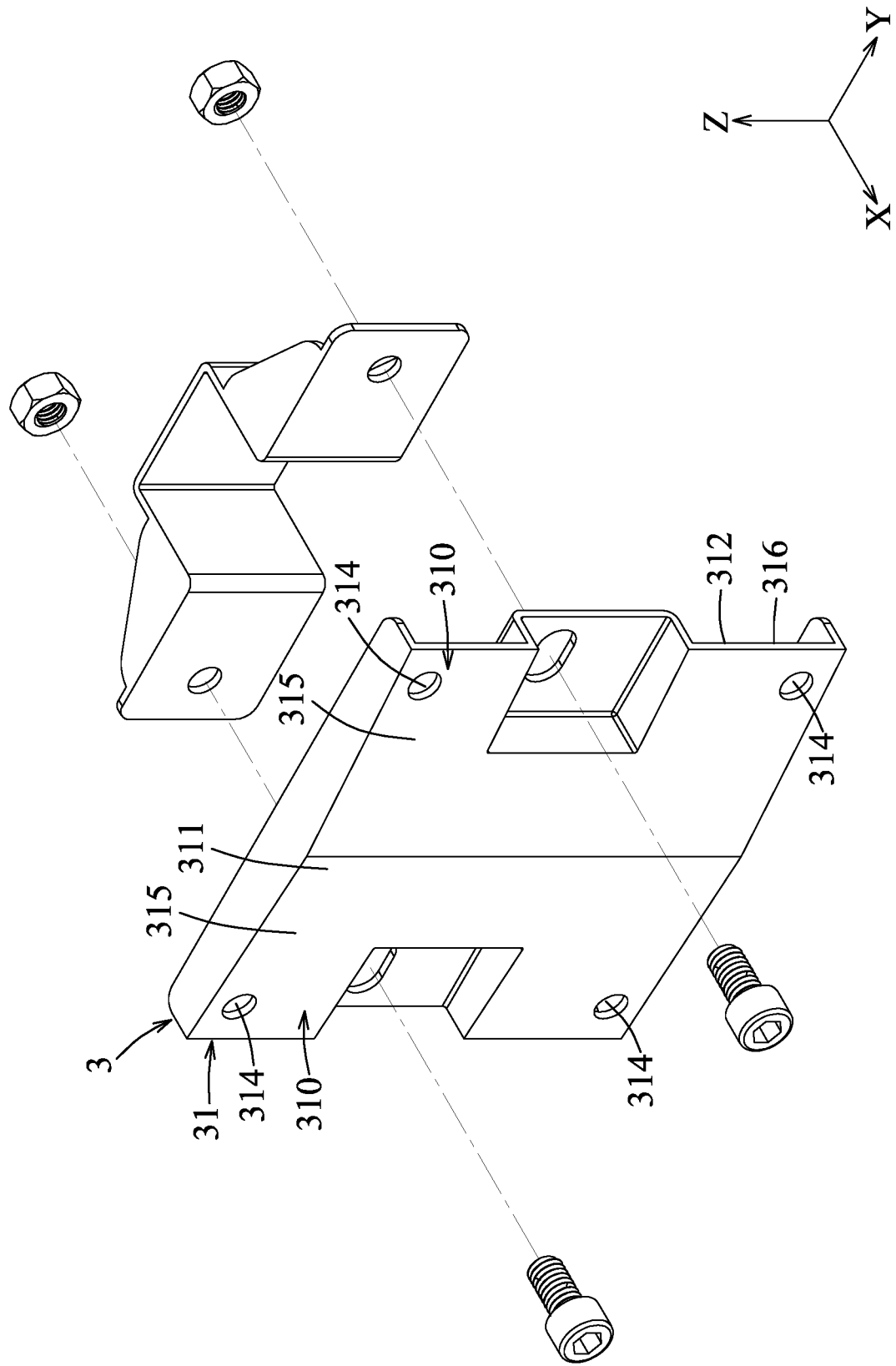
FIG. 10 is a schematic exploded perspective view of the connecting device according to a second embodiment of the present disclosure, the second fastening sets of the fastening unit being omitted.
Figure 11:
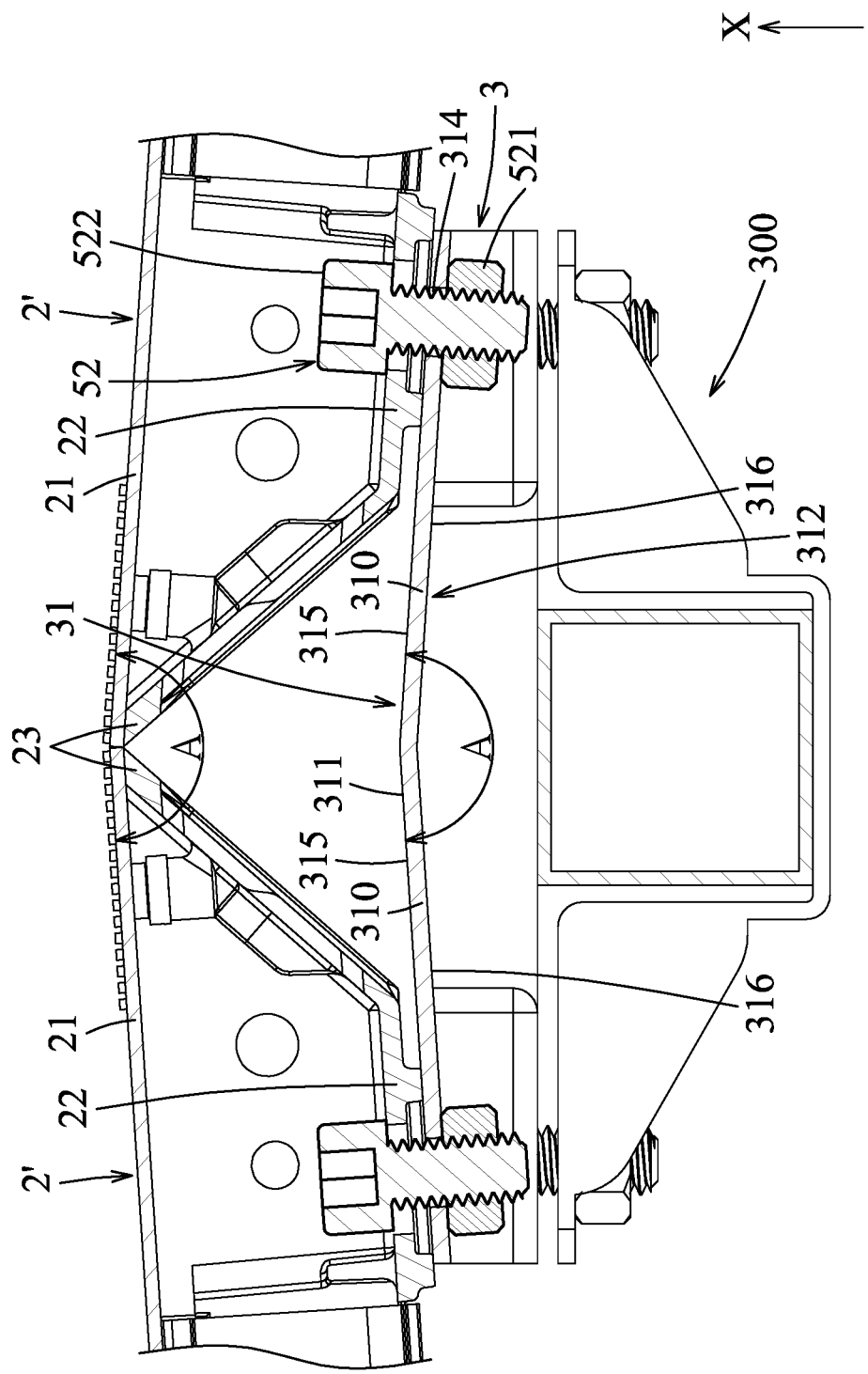
FIG. 11 is a fragmentary sectional view of the second embodiment interconnecting the vertical tube and the display cabinets.

Referring to FIGS. 10 and 11, the connecting device 300 according to a second embodiment of the present disclosure has a structure similar to the first embodiment and the difference therebetween resides in the structure of the first connecting frame 3.

In the second embodiment, the vertical supporting plate 31 of the first connecting frame 3 includes two mounting bodies 310 connected to and inclined with respect to each other. The mounting bodies 310 respectively have two mounting surface portions 315 that are connected to and inclined with respect to each other to define an included angle (A), and that are adapted to mount the display cabinets 2' thereon. In this embodiment, the included angle (A) is 172.5 degrees. The back surface 312 includes two vertical back surface portions 316 connected to and inclined with respect to each other. Each of the mounting bodies 310 is formed with two through holes 314 that are spaced apart from each other along the up-down direction (Z), and is not formed with the perforated holes 313 shown in FIG. 3. Since the included angle (A) is defined between the mounting surface portions 315, and since the mounting bodies 310 is formed with only two through holes 314, only two of the display cabinets 2' can be mounted respectively to the mounting bodies 310.

Since the first connecting frame 3 and the second connecting frame 4 do not bend and warp when being assembled by the first fastening sets 51, the included angle (A) defined between the mounting surface portions 315 remains at 172.5 degrees. When the display cabinets 2' are fastened respectively to the mounting bodies 310 through the second fastening sets 52, the supporting plates 21 of adjacent two of the display cabinets 2' also define an included angle (A) equal to the 172.5 degrees. In this way, it is ensured that the display modules (not shown) carried by the two display cabinets 2' defines an included angle equal to the included angle (A) defined between the supporting plates 21, and thus the connecting device 300 is suitable for mounting display modules having curved displays.

Figure 12:
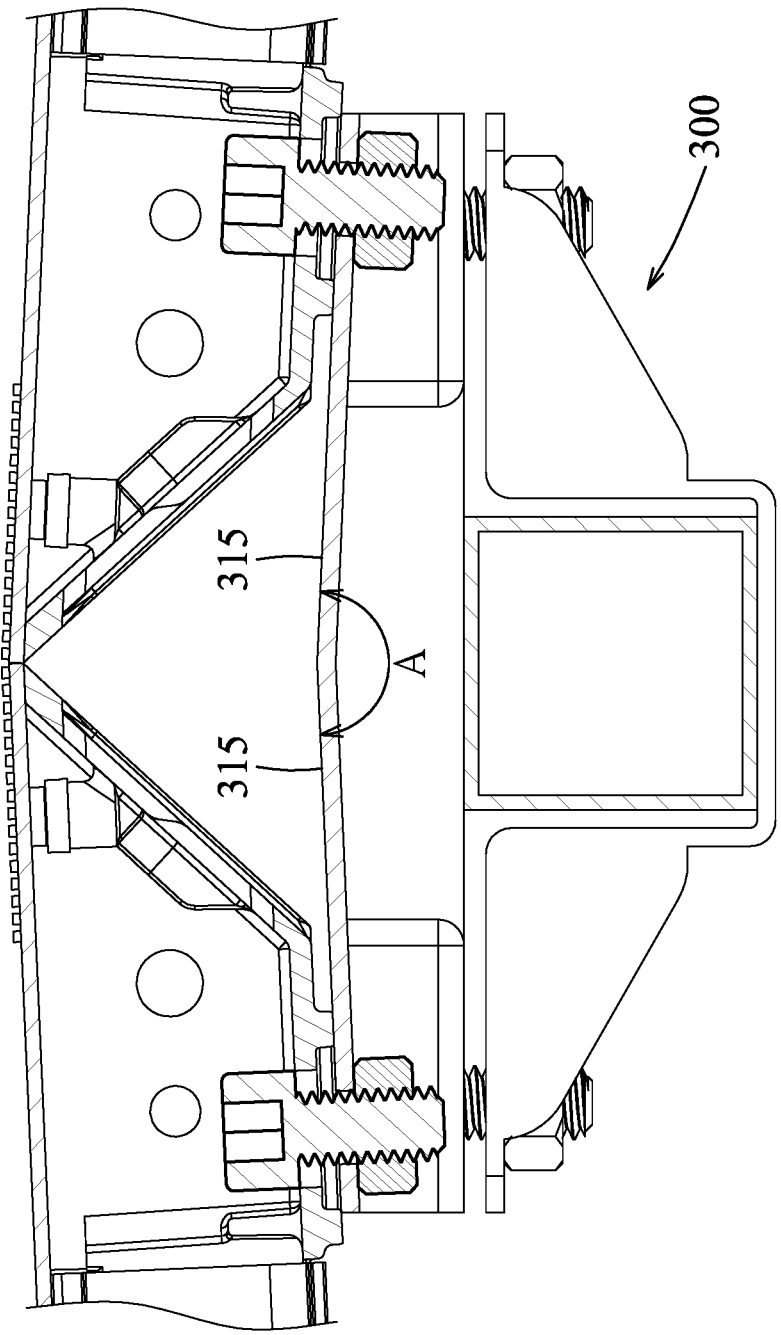
FIG. 12 is a fragmentary sectional view of the connecting device according to a third embodiment of the present disclosure interconnecting the vertical tube and the display cabinets.

Referring to FIG. 12, the connecting device 300 according to a third embodiment of the present disclosure has a structure similar to the second embodiment, and the difference therebetween resides in that the included angle (A) defined between the mounting surface portions 315 is 175 degrees.

Figure 13:
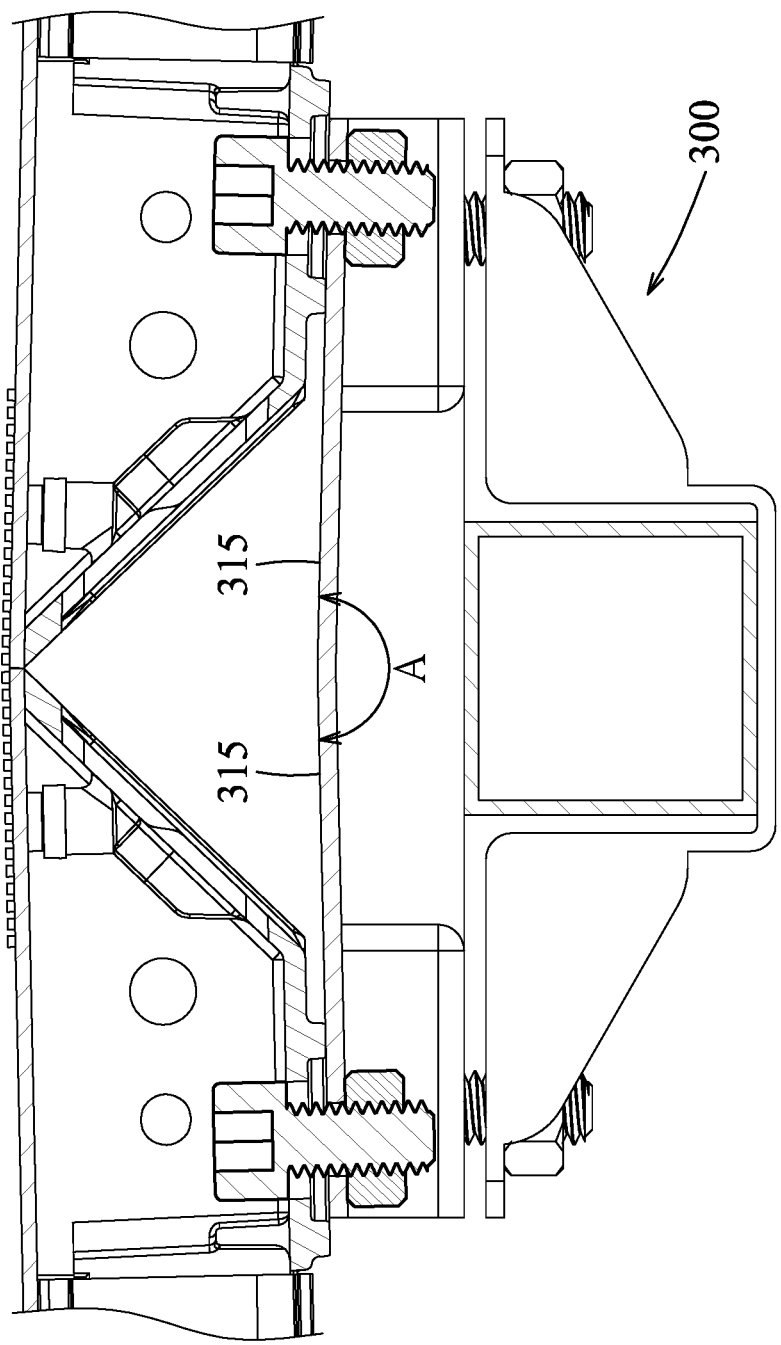
FIG. 13 is a fragmentary sectional view of the connecting device according to a fourth embodiment of the present disclosure interconnecting the vertical tube and the display cabinets.

Referring to FIG. 13, the connecting device 300 according to a fourth embodiment of the present disclosure has a structure similar to the second embodiment, and the difference therebetween resides in that the included angle (A) defined between the mounting surface portions 315 is 177.5 degrees.

Figure 14:
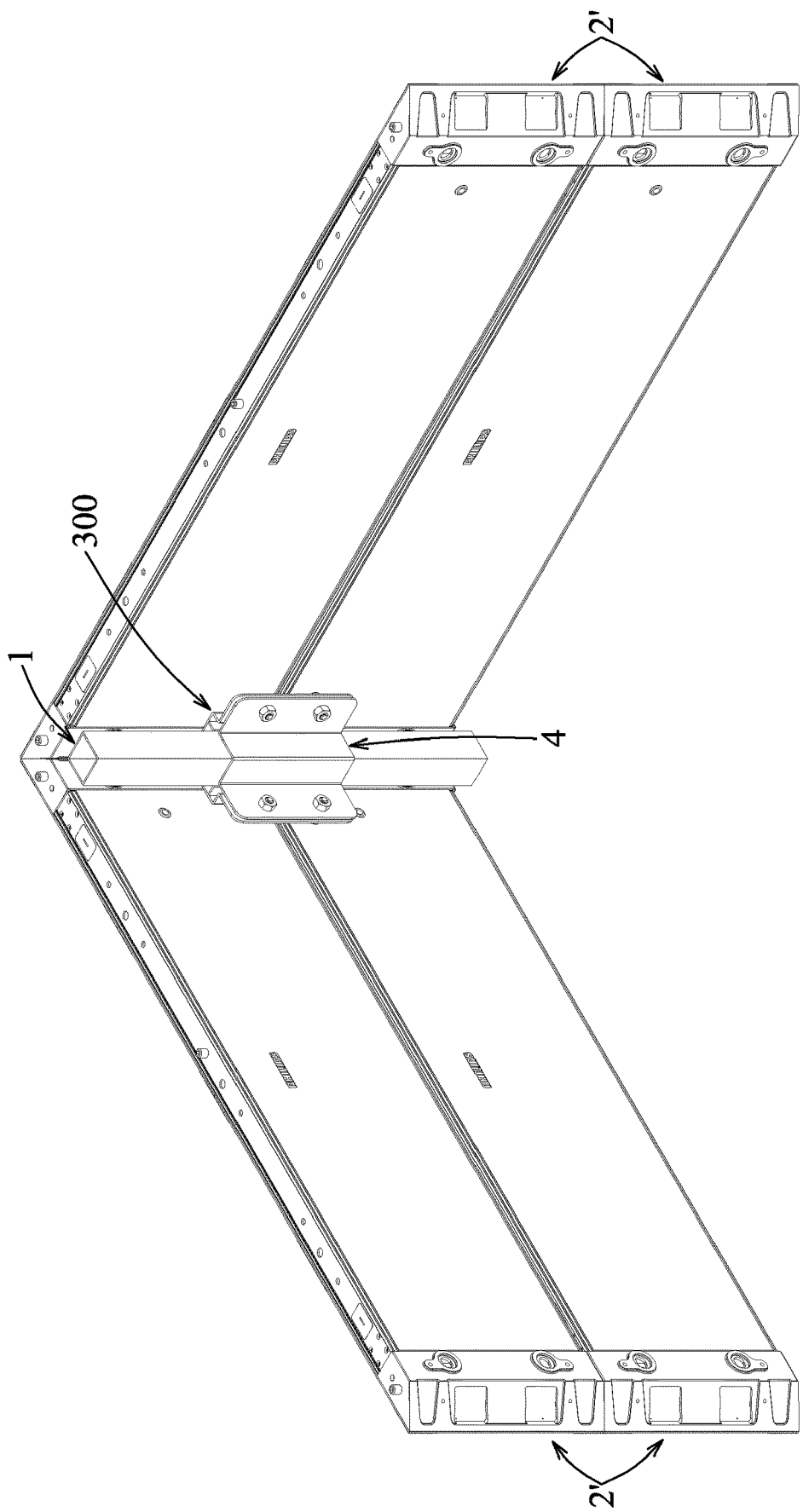
FIG. 14 is a perspective view of the connecting device according to a fifth embodiment of the present disclosure interconnecting the vertical tube and the display cabinets.
Figure 15:
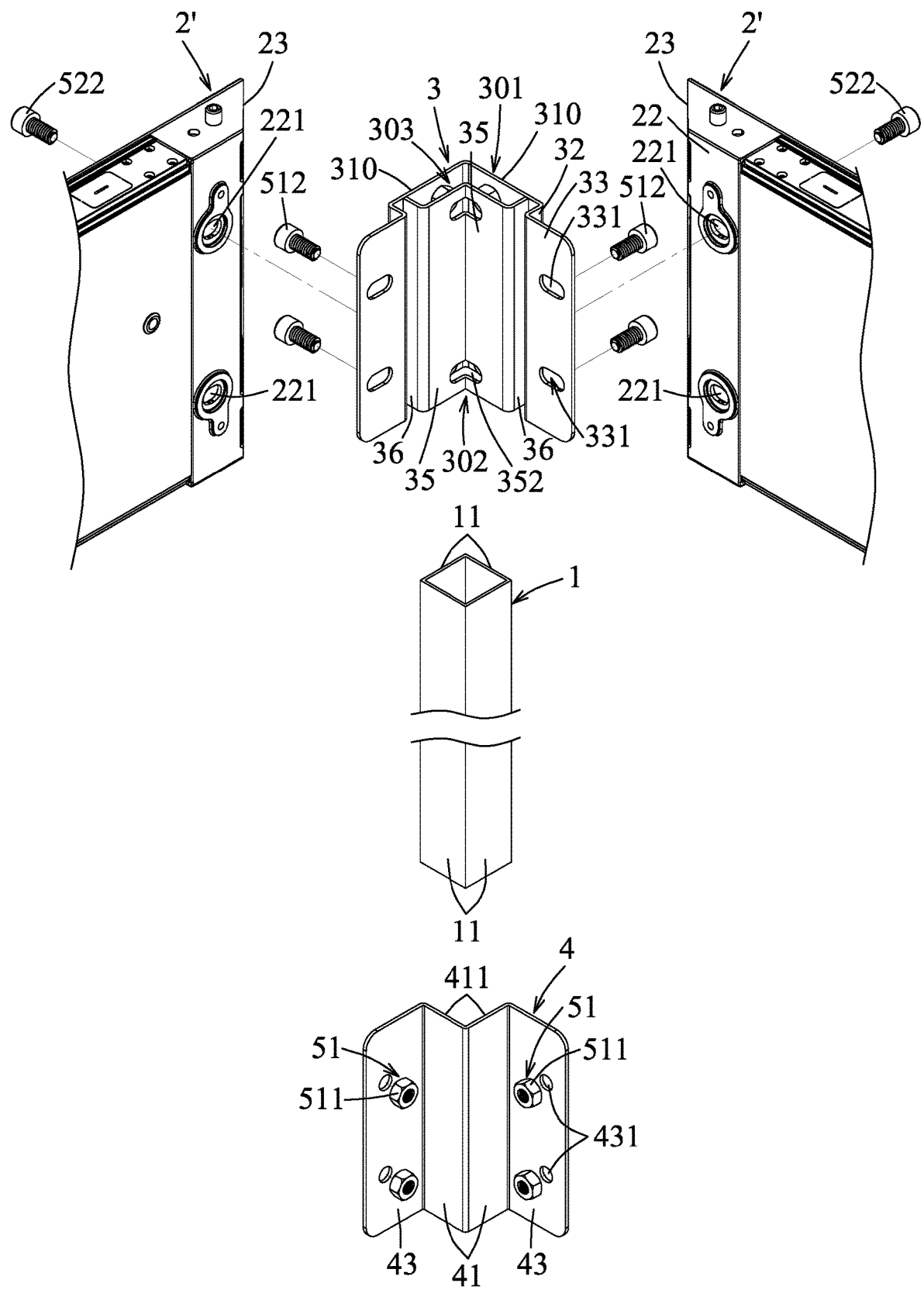
FIG. 15 is a fragmentary partly exploded perspective view of the fifth embodiment, the vertical tube and the display cabinets.

Referring to FIGS. 14 and 15, the connecting device 300 according to a fifth embodiment of the present disclosure has a structure similar to the second embodiment, and the difference therebetween resides in the structure of the first and second connecting frames 3, 4.

Figure 16:
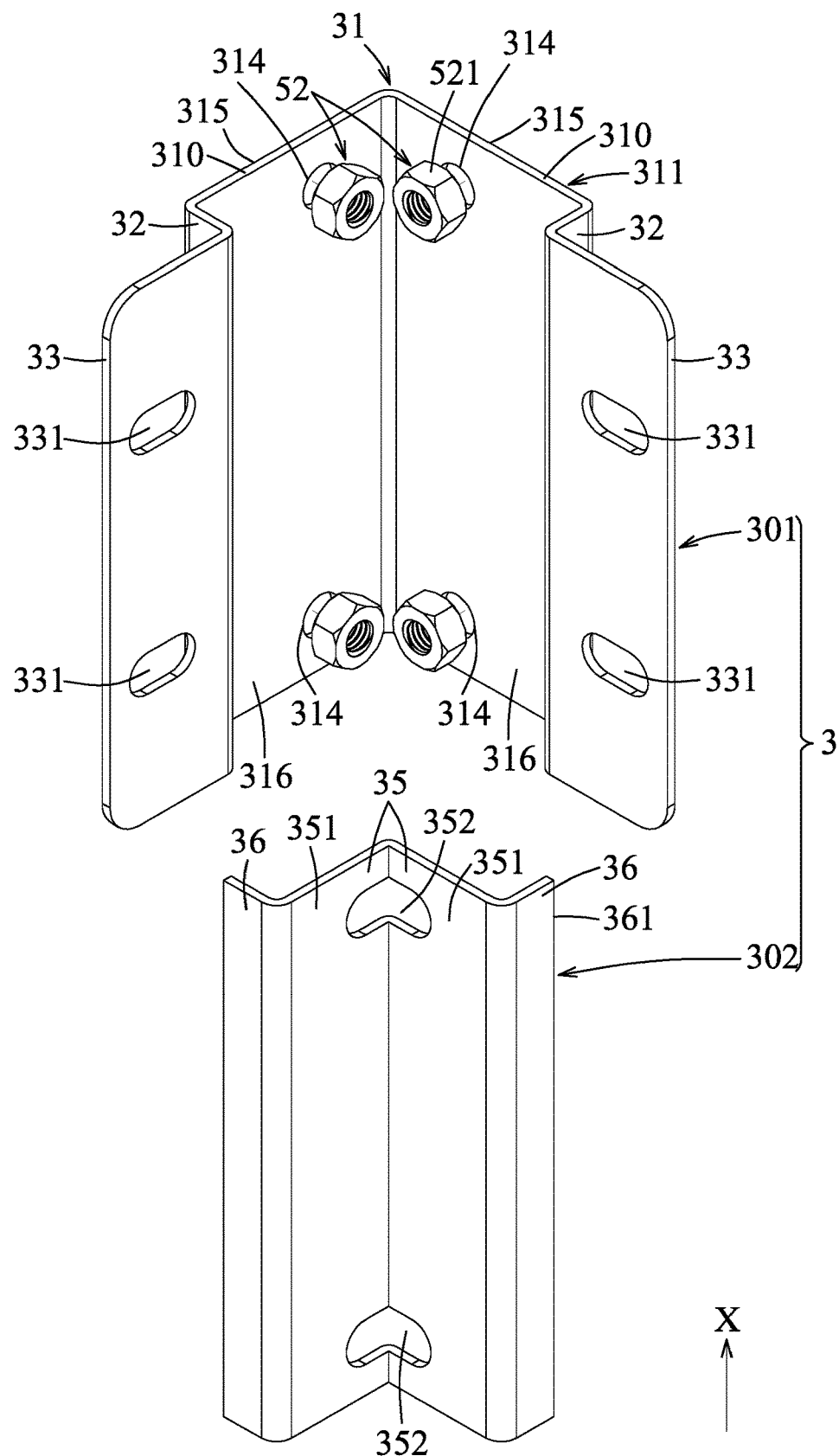
FIG. 16 is an exploded perspective view of the first connecting frame and the second fastening sets of the fifth embodiment.
Figure 17:
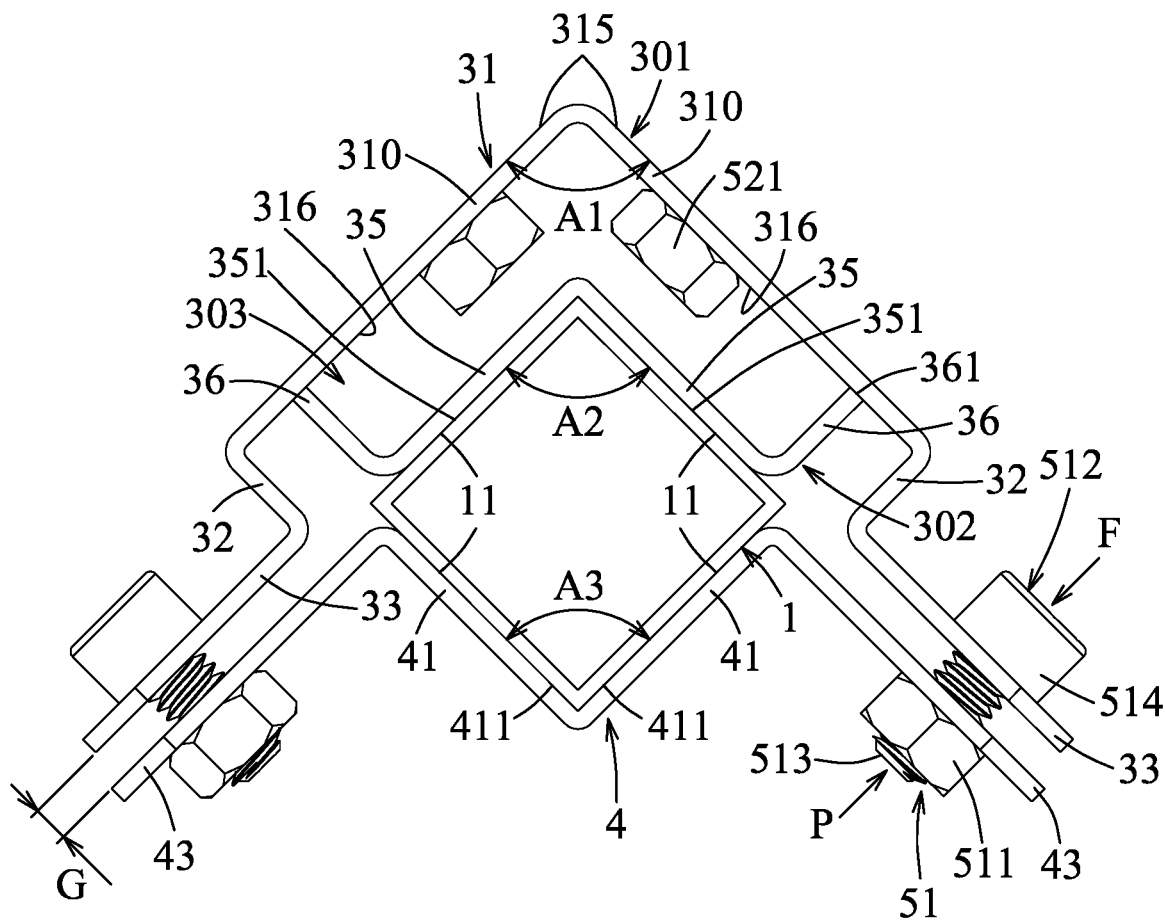
FIG. 17 is a top view of the fifth embodiment being mounted to the vertical tube.

Further referring to FIGS. 15 to 17, in the fifth embodiment, the first connecting frame 3 includes a first frame body 301 and a second frame body 302. The first frame body 301 is formed integrally, and includes the vertical supporting plate 31, the bent plates 32, and the first connecting plates 33. The vertical mounting surface portions 315 are connected perpendicularly to each other at front ends thereof to define a first included angle (A1) of 90 degrees therebetween, and are adapted for mounting the display cabinets 2 thereon. The bent plates 32 are connected respectively to the mounting bodies 310 respectively at left and right sides of the respective mounting bodies 310. Each of the first connecting plates 33 is formed with two through holes 331 spaced apart from each other along the up-down direction (Z).

The second frame body 302 is formed integrally, and has a W-shaped cross section. The second frame body 302 includes two vertical first abutment plates and two vertical side walls 36. The first abutment plates 35 are connected perpendicularly to each other. Each of the first abutment plates 35 has a vertical first abutment surface 351 adapted to abut against the front one of the outer surface portions 11 of the vertical tube 1. The first abutment surfaces 351 of the first abutment plates define a second included angle (A2) equal to the first included angle (A1). An assembly of the first abutment plates 35 are formed with two elongated slots 352 at a junction of the first abutment plates 35. The elongated slots 352 are spaced apart from each other along the up-down direction (Z), and correspond respectively in position to the through holes 314 along the front-rear direction (X). The vertical side walls 36 extend respectively and perpendicularly from outer ends of the first abutment plates 35 so as to cooperate with the first abutment plates 35 to form a W-shape. Each of the side walls 36 has a terminating end 361 connected fixedly, e.g., by welding, to a respective one of the back surface portions 316 of the mounting bodies 310.

To assemble the second frame body 302 to the first frame body 301, the second nut 521 of each of the second fastening sets 52 is securely connected, e.g., by welding, to a corresponding one of the back surface portions 316 and is registered with the corresponding one of the through holes 314. Then, the second frame body 302 is disposed behind the vertical supporting plate 31 of the first frame body 301 such that an end surface of the terminating end 361 of each of the side walls 36 faces the corresponding one of the vertical back surface portions 316. At this time, the vertical supporting plate 31 of the first frame body 301, the first abutment plates 35 and the side walls 36 cooperating with one another to define a space 303 thereamong for receiving a portion of the second fastening sets 52 therein and in spatial communication with the elongated holes 352 and the through holes 314. Since the second frame body 302 has a W-shape cross section, the second frame body 302 is spaced apart from the second nuts 521 after the first and second frame bodies 301, 302 are assembled together.

Referring to FIGS. 15 to 17, the second connecting frame 4 is formed integrally. The second connecting frame 4 has an inverted W-shaped cross section, and includes two vertical second abutment plates 41 and two second vertical connecting plates 43. The second abutment plates 41 are connected perpendicular to each other. Each of the second abutment plates 41 has a vertical second abutment surface 411 facing forwardly, and adapted to abut against a rear one of the outer surface portions 11 of the vertical tube 1. The second abutment surfaces 411 of the second abutment plates 41 define a third included angle (A3) equal to the first included angle (A1). The second connecting plates 43 extend perpendicularly, rearwardly, and outwardly from front ends of the second abutment plates 41, respectively. Each of the second connecting plates 43 is formed with two through holes 431 spaced apart from each other along the up-down direction (Z). In this embodiment, the number of the first fastening sets 51 is four. Each pair of the first fastening sets 51 fasten securely a respective one of the first connecting plates 33 to the corresponding one of the second connecting plate 43 so as to clamp the vertical tube 1 between the first connecting frame 3 and the second connecting frame 4.

The connecting device 300 of the fifth embodiment is used when the display cabinets 2' are interconnected to form a right angle therebetween. In the fifth embodiment, one pair of corners of the vertical tube 1 are opposite to each other along the front-rear direction (X) and the other one pair of corners of the vertical tubes 1 are opposite to each other along the left-right direction (Y). It should be noted that to aid in describing the disclosure, directional definitions used in the first to the fifth embodiments are intended to merely assist in describing and claiming the disclosure and are not intended to limit the disclosure in any way. For example, in other embodiments, the vertical tube 1 can be rotated by 45 degrees to a position shown in the first to the fourth embodiments, so that two opposite vertical outer surface portions 11 of the vertical tube 1 are opposite to each other along the left-right direction (Y), and the remaining two opposite vertical outer surface portions 11 are opposite to each other along the front-rear direction (X).

To assemble, the second abutment surfaces 411 of the second abutment plates 41 are brought to be registered respectively with the rear surface portions 11 of the vertical tube 1, and subsequently the second connecting frame 4 is moved forwardly toward the vertical tube 1 such that the second abutment surfaces 411 abut respectively against the rear surface portions 11. Then, the first abutment surfaces 351 of the first connecting frame 3 are registered respectively with the front surface portions 11 of the vertical tube 1, and subsequently the first connecting frame 3 is moved rearwardly toward the vertical tube 1 such that the first abutment surfaces 351 abut respectively against the front surface portions 11. At this time, the first connecting plate 33 is spaced apart from the second connecting plate 43 by the distance (G).

Afterwards, the first nuts 511 are brought to abut respectively against rear surfaces of the second connecting plates 43 and are registered respectively with the through holes 431. The threaded stem 513 of each of the first bolts 512 is brought to extend through a respective one of the through hole 331 and the corresponding one of the through holes 431 and to threadedly engage the corresponding one of the first nuts 511 until the head 514 of the first bolt 512 abuts against the front surface of the first connecting plates 33. At this time, when the head 514 of each of the first bolts 512 is continuously rotated about its axis, the first pressure (F) is exerted on one of the first connecting plate 33 and the second pressure (P) opposite to the first pressure (F) is exerted on the corresponding one of the second connecting plates 43 by the first nut 511. Since each of the first connecting plates 33 is spaced apart from the corresponding one of the second connecting plates 43 by the distance (G), the first pressure (F) and the second pressure (P) cannot cancel each other out. If the first pressure (F) and the second pressure (P) cancel each other out, the first connecting plates 33 would bend respectively toward the second connecting plates 43 due to the first pressure (F) so that a distance between each of the first connecting plates 33 and the corresponding one of the second connecting plates 33 is decreased. Similarly, the second connecting plates 43 would bend respectively toward the first connecting plates 33 due to the second pressure (P), to further decrease the distance between each of the first connecting plates 33 and the corresponding one of the second connecting plates 33.

The first pressure (F) propagates through the first connecting plates 33, the bent plates 32 connected to the first connecting plates 33, the mounting bodies 310 connected to the bent plates 32, and the side walls 36 connected to the mounting bodies 310 to the first abutment plates 35, such that the first abutment surface 351 of each of the first abutment plates 35 abuts tightly against the corresponding one of the outer surface portions 11 of the vertical tube 1 without causing warpage. At the same time, the second pressure (P) propagates through the second connecting plates 43 to the second abutment plate 41 connected thereto, such that the vertical second abutment surface 411 of the second abutment plate 41 abuts against the outer surface portions 11 of the tube 1 without causing warpage. Thus, the first and second connecting frames 3, 4 securely clamp the vertical tube 1 therebetween.

It should be stated that since the second connecting frame 4 has an inverted W-shape cross-section, is an integrally formed piece, and is complementary in shape with the vertical tube 1, it serves as a spring plate. The second frame body 302 is an integrally formed piece having a W-shape cross-section and is complementary in shape with the vertical tube 1, so that the space 303 defined therein can be provided as a buffer region when the second frame body 302 is deformed due to external force exerted thereon. Thus, the second frame body 302 also serves as a spring plate. In this way, in a case that any two of the vertical outer surface portions 11 are not parallel to the vertical direction, full contact among the vertical tube 1 and the first and second connecting frames 3, 4 still can be achieved so as to tightly clamp the vertical tube 1 between the first and second connecting frames 3, 4.

Figure 18:
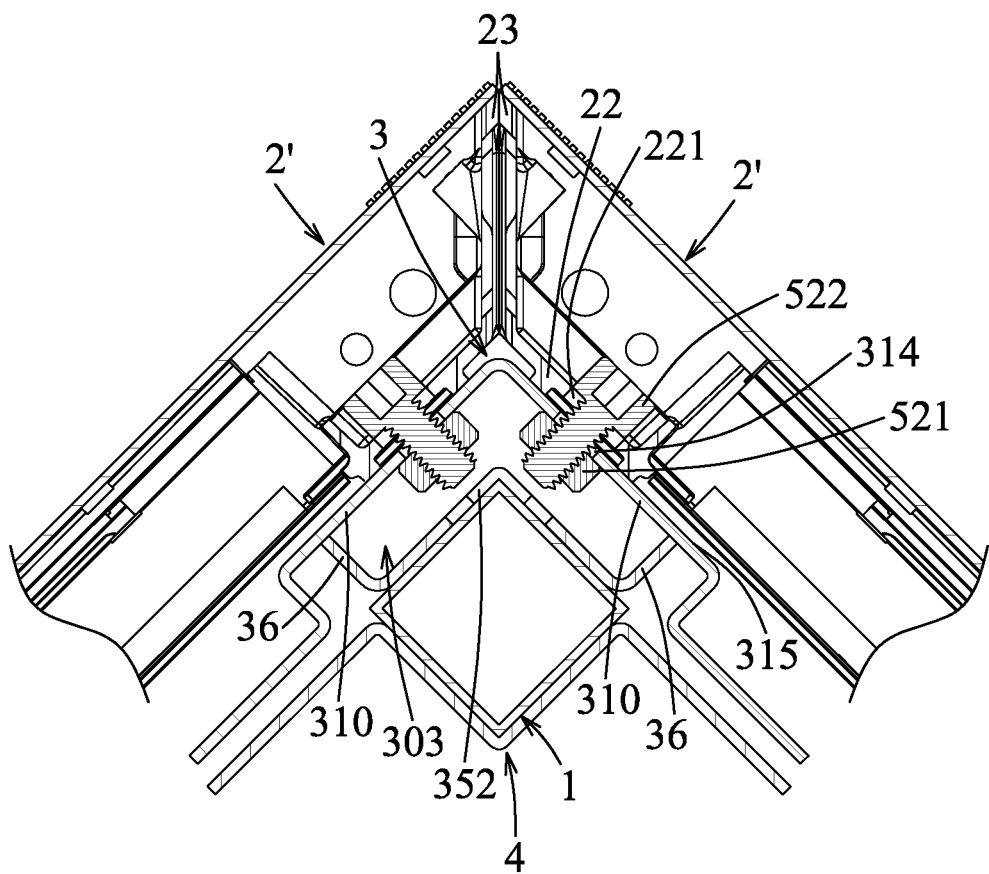
FIG. 18 is a fragmentary sectional view of the fifth embodiment interconnecting the vertical tube and the display cabinets.

Referring to FIGS. 17 and 18, during assembly, the back plate 22 of each of the display cabinets 2' is first brought to abut against the mounting surface portion 315 of the corresponding one of the mounting bodies 310 such that one of the openings 221 formed in the back plate 22 is registered with the corresponding one of the through holes 314. Next, each of the second bolts 522 is brought to extend through said one of the openings 221 and the corresponding one of the through holes 314, and to engage the respective one of the second nuts 521 to fasten each of the display cabinets 2' to the corresponding one of the mounting bodies 310. Since the mounting bodies 310 are respectively supported by the side walls 36 and would not deform due to the first pressure (F), an included angle (A) defined between the mounting surface portions 315 remains unchanged. In this way, the mounting surface portions 315 abut respectively against the back plates 22 of the display cabinets 2, 2' to achieve an effect of full contact, so that an included angle defined between the supporting plates 21 of adjacent two of the display cabinets 2' can be maintained at degrees after the side plates 23 of adjacent two of the display cabinets 2' abut against each other.

It should be stated that the abovementioned assembling procedures may be modified as follows. First, each of the second nuts 522 is brought to fasten the respective one of the display cabinets 2' to the corresponding one of the supporting plates 31. Then, the first fastening sets 51 fasten the first connecting frame 3 to the second connection frame 4. During the second bolts 522 respectively engage the second nuts 521, the assembler is able to observe the second bolts 522 through the elongated slots 352 to ensure that the second bolt 522 indeed respectively engage the second nuts 521. Additionally, to adjust the supporting plate 21 of each of the display cabinets 2' relative to the connecting device 300, one of the second bolts 52 is replaced by an additional bolt (not shown) that has a length longer than that of the second bolt 52, that engages the corresponding one of the second nuts 521, that extends through a corresponding one of the elongated slots 352, and that abuts against the outer surface portion 11 of the vertical tube 1. Thus, the back plate 22 is movable along the additional bolt so as to adjust the position of the supporting plate 21 of each of the display cabinets 2' relative to the connecting device 300.

Figure 19:
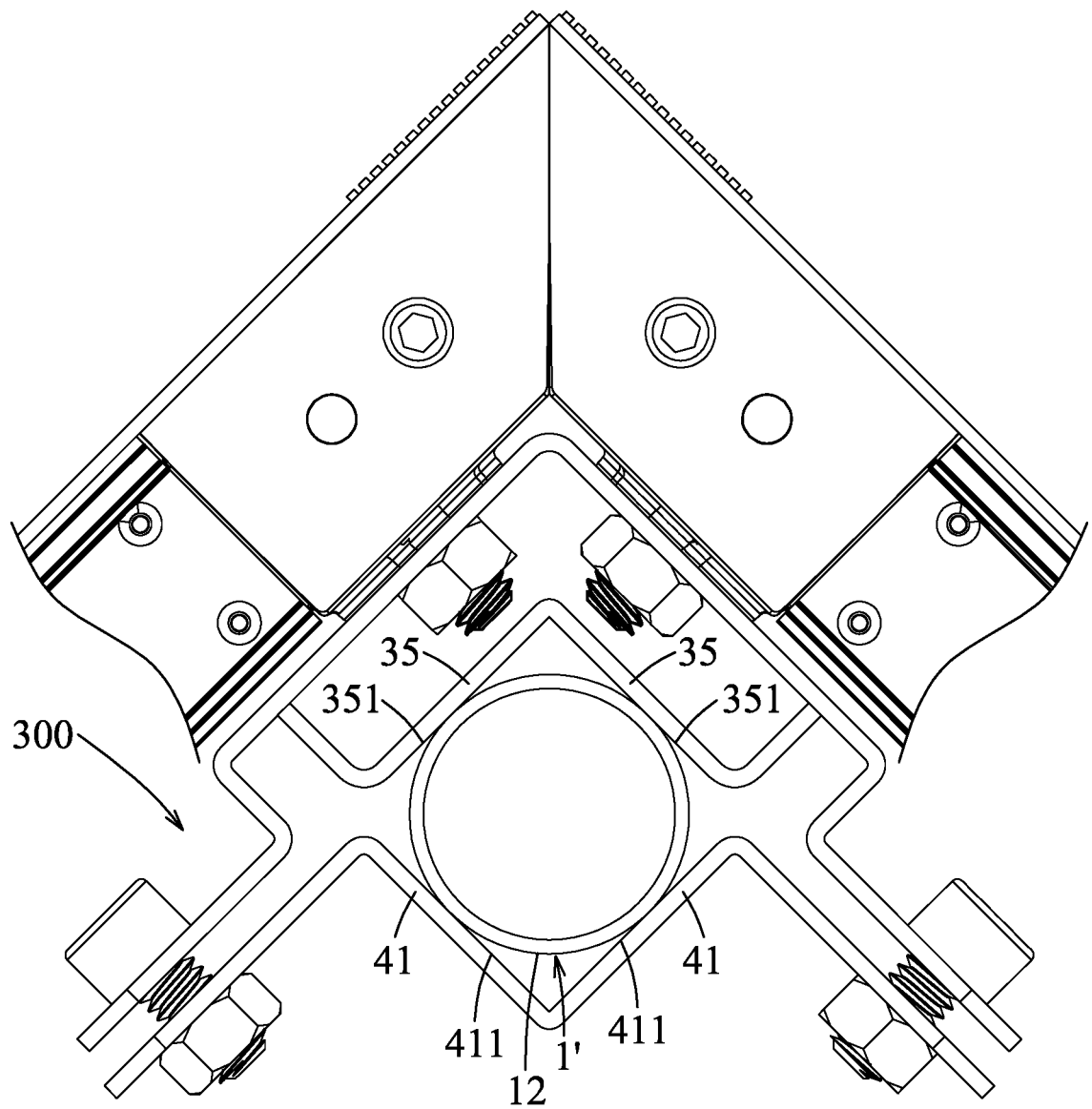
FIG. 19 is a fragmentary schematic top view of the fifth embodiment interconnecting a vertical tube having a different configuration and the display cabinets.

Referring to FIG. 19, in the fifth embodiment, the connecting device 300 can be mounted to a vertical tube 1' having a configuration different from the vertical tube 1 shown in FIG. 18. The vertical tube 1' is a cylindrical tube and has an outer surface 12. By virtue of the first abutment surfaces 351 of the first abutment plates 35 and the second abutment surfaces 411 of the second abutment plates 41 that abut against the outer surface 12 of the vertical tube 1' tightly, the first and second connecting frames 3, 4 tightly clamp the vertical tube 1' therebetween.

To sum up, by virtue of design of the first and second connecting frames 3, 4 and the fastening unit 5, the vertical tube 1 can be mounted quickly to the display units 2, 2' by the connecting device 300 of the present disclosure in a simple manner so as to decrease time for assembly as compared to the conventional connecting devices described in the background section. Additionally, by virtue of the first and second connecting frames 3, 4, the first abutment surfaces 351 abut against the front surface portions 11 of the vertical tube and the second abutment surfaces 411 abut against the rear surface portions 11 of the vertical tube 1 to achieve an effect of full contact when the first fastening sets 51 secure the first and second connecting frames 3, 4 together. In this way, the first connecting frame 3 can be prevented from warpage during assembling the first fastening sets 51, and the mounting surface 311 of the first connecting frame 3 can abut against the back plates 22 of the display cabinets 2, 2' to achieve the full contact effect.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiment, it is understood that this disclosure is not limited to the disclosed embodiments but is intended to cover various arrangements included within the spirit and scope of the broadest interpretation so as to encompass all such modifications and equivalent arrangements.

What is claimed is:

1. A connecting device for interconnecting a vertical tube and a plurality of display cabinets for carrying display modules, the vertical tube including a plurality of vertical outer surface portions, said connecting device comprising:
    a first connecting frame adapted for mounting the display cabinets thereon, adapted to be disposed in front of the vertical tube, and adapted to abut against a front one of the outer surface portions of the vertical tube that faces the display cabinets;
    a second connecting frame spaced apart from said first connecting frame along a front-rear direction, adapted to be disposed behind the vertical tube, and adapted to abut against a rear one of the outer surface portions of the vertical tube that faces away from said first connecting frame; and
    a fastening unit including two first fastening sets and a plurality of second fastening sets, said first fastening sets being spaced apart from each other along a left-right direction transverse to the front-rear direction and fastening said first connecting frame securely to said second connecting frame so as to clamp the vertical tube between said first connecting frame and said second connecting frame, said second fastening sets being adapted to fasten the display cabinets securely to said first connecting frame;
    wherein said first connecting frame includes a vertical supporting plate, two vertical bent plates, and two first vertical connecting plates, said vertical supporting plate having a vertical mounting surface adapted for mounting the display cabinets thereon and a back surface opposite to said mounting surface along the front-rear direction, said second fastening sets being adapted for fastening the display cabinets securely to said vertical supporting plate, said bent plates extending rearwardly from said back surface of said vertical supporting plate and being spaced apart from each other along the left-right direction, each of said first connecting plates being spaced apart from said vertical supporting plate, said second connecting frame including two vertical second connecting plates corresponding respectively in position to said first connecting plates along the front-rear direction, each of said first connecting plates being spaced apart from the respective one of said second connecting plates by a gap, each of said first fastening sets fastening a respective one of said first connecting plates to a corresponding one of said second connecting plates; and
    wherein said first connecting frame further includes at least two horizontal first strengthening plates and two horizontal first abutment plates, each of said first strengthening plates being connected among said vertical supporting plate, a respective one of upper and lower ends of a respective one of said bent plates, and a respective one of upper and lower ends of a respective one of said first connecting plates, said first abutment plates extending rearwardly and respectively from upper and lower ends of said vertical supporting plate that are opposite along an up-down direction transverse to the front-rear direction and the left-right direction, each of said first abutment plates having a vertical first abutment surface that faces rearwardly and that is adapted to abut against the front one of the surface portions of the vertical tube.

2. The connecting device as claimed in claim 1, wherein said first connecting frame includes two pairs of said first strengthening plates that are adapted to flank the vertical tube and that are spaced apart from each other along the left-right direction, each pair of said first strengthening plates being spaced apart from each other along the up-down direction, being connected respectively to upper and lower ends of a corresponding one said bent plates, and being connected respectively to upper and lower ends of a respective one of said first connecting plates.

3. The connecting device as claimed in claim 1, wherein said second connecting frame further includes a vertical second abutment plate, said second abutment plate having a vertical second abutment surface adapted to abut against the rear one of the outer surface portions of the vertical tube.

4. The connecting device as claimed in claim 3, wherein said second connecting frame further includes two vertical side plates extending respectively and forwardly from left and right ends of said second abutment plate along the front-rear direction, said second connecting plates extending respectively and outwardly from front ends of said side plates, said second abutment plate, said side plates and said second connecting plates cooperating with one another to define a receiving slot adapted for receiving the vertical tube therein such that a portion of the vertical tube is exposed outwardly of said receiving slot.

5. The connecting device as claimed in claim 4, wherein said second connecting frame further includes at least two horizontal second strengthening plates that are adapted to flank the vertical tube, each of said second strengthening plates being connected between a corresponding one of said second connecting plates and a respective one of said side plates.

6. The connecting device as claimed in claim 5, wherein said second connecting frame includes two pairs of said second strengthening plates that are adapted to flank the vertical tube, each pair of said second strengthening plates being spaced apart from each other along the up-down direction.

7. The connecting device as claimed in claim 1, wherein said vertical supporting plate is formed with four perforated holes and four through holes, said perforated holes being spaced apart from one another and being arranged in a square, said through holes being spaced apart from one another and being arranged in another square surrounding said perforated holes, the number of said second fastening sets of said fastening unit being four, each of said second fastening sets extending through a respective one of said perforated holes to fasten the display cabinets securely to said first connecting frame.

8. The connecting device as claimed in claim 1, wherein said vertical mounting surface includes two vertical mounting surface portions that are connected to and inclined with respect to each other to define an included angle, and that are adapted to mount the display cabinets thereon.

9. The connecting device as claimed in claim 8, wherein the included angle defined between said mounting surface portions is one of 172.5 degrees, 175 degrees, and 177.5 degrees.

10. The connecting device as claimed in claim 1, wherein said vertical supporting plate is formed with four perforated holes and four through holes, said perforated holes being spaced apart from one another and being arranged in a square, said through holes being spaced apart from one another and being arranged in another square surrounding said perforated holes, the number of said second fastening sets of said fastening unit being four, each of said second fastening sets extending through a respective one of said through holes to fasten the display cabinets securely to said first connecting frame.

11. A connecting device for interconnecting a vertical tube and a plurality of display cabinets for carrying display modules, the vertical tube including a plurality of vertical outer surface portions, said connecting device comprising:
a first connecting frame adapted for mounting the display cabinets thereon, adapted to be disposed in front of the vertical tube, and adapted to abut against a front one of the outer surface portions of the vertical tube that faces the display cabinets;
a second connecting frame spaced apart from said first connecting frame along a front-rear direction, adapted to be disposed behind the vertical tube, and adapted to abut against a rear one of the outer surface portions of the vertical tube that faces away from said first connecting frame; and
a fastening unit including two first fastening sets and a plurality of second fastening sets, said first fastening sets being spaced apart from each other along a left-right direction transverse to the front-rear direction and fastening said first connecting frame securely to said second connecting frame so as to clamp the vertical tube between said first connecting frame and said second connecting frame, said second fastening sets being adapted to fasten the display cabinets securely to said first connecting frame;
wherein said first connecting frame includes a vertical supporting plate, two vertical bent plates, and two first vertical connecting plates, said vertical supporting plate having a vertical mounting surface adapted for mounting the display cabinets thereon and a back surface opposite to said mounting surface along the front-rear direction, said second fastening sets being adapted for fastening the display cabinets securely to said vertical supporting plate, said bent plates extending rearwardly from said back surface of said vertical supporting plate and being spaced apart from each other along the left-right direction, each of said first connecting plates being spaced apart from said vertical supporting plate, said second connecting frame including two vertical second connecting plates corresponding respectively in position to said first connecting plates along the front-rear direction, each of said first connecting plates being spaced apart from the respective one of said second connecting plates by a gap, each of said first fastening sets fastening a respective one of said first connecting plates to a corresponding one of said second connecting plates; and
wherein said mounting surface includes two vertical mounting surface portions that are connected perpendicularly to each other at rear ends thereof to define a first included angle of 90 degrees therebetween, and that are adapted for mounting the display cabinets thereon,
said first connecting frame further including two vertical first abutment plates connected perpendicularly to each other, and two vertical side walls extending respectively and perpendicularly from outer ends of said first abutment plates so as to cooperate with the first abutment plates to form a W-shape, each of said first abutment plates having a vertical first abutment surface adapted to abut against the front one of the outer surface portions of the vertical tube, said first abutment surfaces of said first abutment plates defining a second included angle equal to the first included angle.

12. The connecting device as claimed in claim 11, wherein said vertical supporting plate includes two mounting bodies each having a respective one of said mounting surface portions, said second fastening sets being adapted for fastening securely the display cabinets to said first mounting bodies, said bent plates being connected respectively to said mounting bodies, said back surface including two vertical back surface portions connected perpendicularly to each other, each of said side walls having a terminating end connected fixedly to a respective one of said back surface portions, said vertical supporting plate, said first abutment plates and said side walls cooperating with one another to define a space thereamong for receiving a portion of said second fastening sets therein.

13. The connecting device as claimed in claim 12, wherein the number of said second fastening sets of said fastening unit is four, each of said mounting bodies being formed with two through holes that are spaced apart from each other along the up-down direction transverse to the left-right direction and the front-rear direction and that are in spatial communication with said space, each of said second fastening set extending through a respective one of said through holes to fasten a corresponding one of the display cabinets securely to said first connecting frame, an assembly of said first abutment plates being formed with two elongated slots at a junction of said first abutment plates, said elongated slots being spaced apart from each other along the up-down direction, in spatial communication with said space, and corresponding in position to said through holes along the front-rear direction.

14. The connecting device as claimed in claim 11, wherein said first connecting frame includes a first frame body and a second frame body, said first frame body being formed integrally and including said vertical supporting plate, said bent plates and said first connecting plates, said second frame body being formed integrally and including said first abutment plates and said side walls.

15. The connecting device as claimed in claim 14, wherein said second connecting frame is formed integrally and has an inverted W-shaped cross section, said second frame body cooperating with said second connecting frame to clamp the vertical tube therebetween.

16. The connecting device as claimed in claim 11, wherein said second connecting frame includes two vertical second abutment plates connected perpendicularly to each other, each of said second abutment plates having a vertical second abutment surface adapted to abut against the rear one of the outer surface portions of the vertical tube, said second abutment surfaces of said second abutment plates defining a third included angle equal to the first included angle, said second connecting plates extending perpendicularly from said second abutment plates.

\* \* \* \* \*